United States Patent
Bellio

(10) Patent No.: US 12,253,307 B2
(45) Date of Patent: Mar. 18, 2025

(54) DEHUMIDIFICATION METHOD AND APPARATUS

(71) Applicant: PIOVAN S.P.A., Santa Maria di Sala (IT)

(72) Inventor: Enrico Bellio, Ponzano Veneto (IT)

(73) Assignee: PIOVAN S.P.A., Santa Maria di Sala (IT)

( * ) Notice: Subject to any disclaimer, the term of this patent is extended or adjusted under 35 U.S.C. 154(b) by 1162 days.

(21) Appl. No.: 17/054,998

(22) PCT Filed: May 9, 2019

(86) PCT No.: PCT/IB2019/053821
§ 371 (c)(1),
(2) Date: Nov. 12, 2020

(87) PCT Pub. No.: WO2019/220280
PCT Pub. Date: Nov. 21, 2019

(65) Prior Publication Data
US 2021/0215423 A1 Jul. 15, 2021

(30) Foreign Application Priority Data

May 14, 2018 (IT) .......................... 102018000005337
May 14, 2018 (IT) .......................... 102018000005339
(Continued)

(51) Int. Cl.
*F26B 21/04* (2006.01)
*B01D 53/26* (2006.01)
(Continued)

(52) U.S. Cl.
CPC ............ *F26B 21/04* (2013.01); *B01D 53/261* (2013.01); *B29B 9/16* (2013.01); *F26B 21/028* (2013.01);
(Continued)

(58) Field of Classification Search
CPC ...... F26B 21/04; F26B 21/028; F26B 21/083; F26B 21/08; B01D 53/261; B01D 2259/402; B29B 9/16; B29B 2009/168
(Continued)

(56) References Cited

U.S. PATENT DOCUMENTS 5,926,969 A 7/1999 Crawford et al.
7,014,683 B2 * 3/2006 Vierling ................ F26B 21/083
96/144
(Continued)

FOREIGN PATENT DOCUMENTS

DE 31 45 921 A1 7/1983
DE 91 11 679 U1 5/1992
(Continued)

OTHER PUBLICATIONS

Translation, WO2012/034147A1, Freh et al. Mar. 22, 2012 (Year: 2012).*
(Continued)

*Primary Examiner* — Jessica Yuen
(74) *Attorney, Agent, or Firm* — Oliff PLC

(57) ABSTRACT

A method and an apparatus for the dehumidification and/or drying of plastic material in the form of granules and/or micro-granules and/or powder and/or flakes or similar are described, with at least one hopper for dehumidifying/drying the plastic material, a generator of a process fluid that passes through the hopper, at least two molecular sieves towers arranged in parallel and operating alternately to dehumidify the process fluid, and at least one source of a regeneration fluid by heating the molecular sieves. The invention allows to improve the energy efficiency of the regeneration cycle of molecular sieves.

21 Claims, 12 Drawing Sheets

(30) Foreign Application Priority Data

May 14, 2018 (IT) .................. 102018000005341
May 14, 2018 (IT) .................. 102018000005342

(51) Int. Cl.
*B29B 9/16* (2006.01)
*F26B 21/02* (2006.01)
*F26B 21/08* (2006.01)

(52) U.S. Cl.
CPC ...... *F26B 21/083* (2013.01); *B01D 2259/402* (2013.01); *B29B 2009/168* (2013.01)

(58) Field of Classification Search
USPC .................................................. 430/180, 181
See application file for complete search history.

(56) References Cited

U.S. PATENT DOCUMENTS

| | | |
|---|---|---|
| 2005/0268481 A1 | 12/2005 | Wiedl et al. |
| 2007/0130791 A1 | 6/2007 | Cattapan |

FOREIGN PATENT DOCUMENTS

| | | | |
|---|---|---|---|
| DE | 197 19 483 A1 | 11/1998 | |
| DE | 10 2004 013447 A1 | 9/2005 | |
| EP | 1 306 635 A1 | 5/2003 | |
| EP | 2447027 A1 * | 5/2012 | ........... B29B 13/065 |
| WO | 2012/034147 A1 | 3/2012 | |
| WO | 2017/103721 A1 | 6/2017 | |

OTHER PUBLICATIONS

Nov. 26, 2018 Written Opinion and Search Report issued in Italian Patent Application No. IT-102018000005341.
Nov. 26, 2018 Written Opinion and Search Report issued in Italian Patent Application No. IT-102018000005339.
Nov. 22, 2018 Written Opinion and Search Report issued in Italian Patent Application No. IT-102018000005337.
Nov. 28, 2018 Written Opinion and Search Report issued in Italian Patent Application No. IT-102018000005342.
Jul. 2, 2019 Search Report issued in International Patent Application No. PCT/IB2019/053821.
Jul. 2, 2019 Written Opinion of the International Searching Authority issued in International Patent Application No. PCT/IB2019/053821.

* cited by examiner

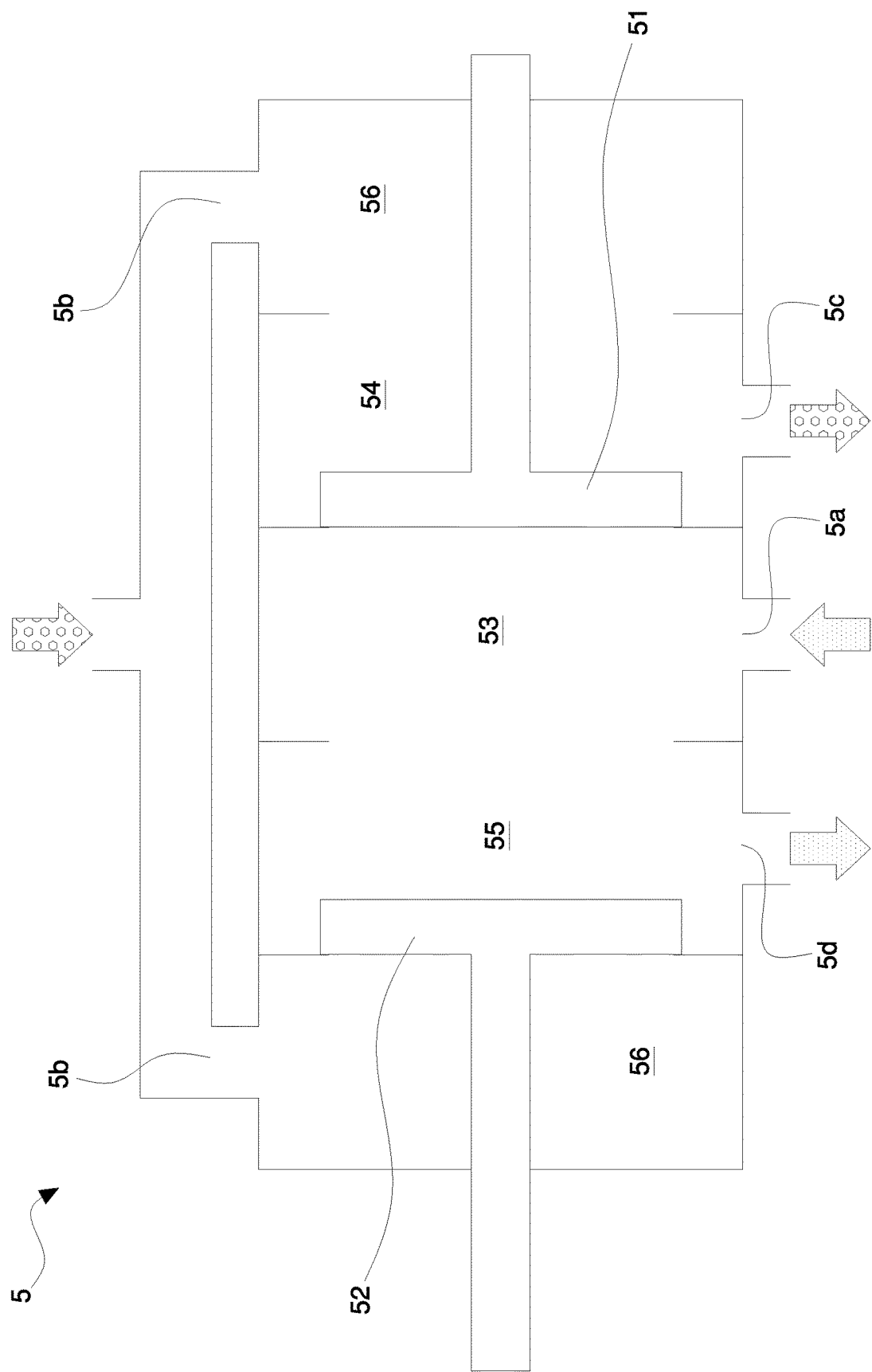

DEHUMIDIFICATION METHOD AND APPARATUS

BACKGROUND OF THE INVENTION

The invention relates to a method and/or apparatus for dehumidification and/or drying, which can be used, in particular, to dehumidify and/or dry plastic material in incoherent format, for example in the form of granules and/or micro-granules and/or powder and/or flakes and/or other similar formats.

Specifically, but not exclusively, the invention can be applied in the industry for the transformation of plastic materials, for the purpose of processing plastic material intended to feed user machines, in particular machines for processing and transforming plastic material, such as extrusion machines, and then injection and/or blowing and/or compression molding machines.

It is known, in the field of plastics molding, to dehumidify the plastic material which is then fed to the user machines. Dehumidification takes place by means of a process fluid (air). In particular, for a correct dehumidification, the "degree of dewpoint" of the process fluid must be guaranteed. This can be achieved by different technologies of known type, each of which is suitable for satisfying certain requirements and working conditions.

One of these known technologies, widely used for the dehumidification of plastic resins, involves the passage of the process fluid through a bed of molecular sieves, for example using aluminosilicates, in particular zeolites. In this case the dehumidifiers of the process fluid comprise molecular sieves ensiled in specific containers, generally cylindrical (but not only), equipped with at least one inlet and at least one outlet for the passage of the fluid to be treated.

Molecular sieves have a high porosity, measured in Angstrom (Å). The so-called polar affinity (linked to the electric charge) of the sieves towards the molecules of the substance to be adsorbed, combined with high porosity and therefore a high surface, allows a high capacity of adsorption. Molecular sieves are used, for example, in various chemical processes to purify the process fluid from pollutants and/or contaminants. An example is a purification tower for removing $CO_2$ or nitrogenous substances. In the field of plastic resin treatment, molecular sieves are used to absorb moisture from the process fluid. Various types of molecular sieves are known, with different affinities and adsorption capacities, with different sizes and/or geometric shapes, characterized by a specific pore size. There are commercially available molecular sieves with different dimensions and/or geometric shapes to optimize compaction, the pressure losses due to the passage of the fluid, the adsorption diffusion.

During the dehumidification process, the plastic granule transfers moisture to the process fluid which subsequently passes through the molecular sieves which in turn adsorb moisture from the process fluid. At the end of the adsorption cycle the molecular sieves appear to be more or less saturated. The molecular sieves, once saturated, that is, when the adsorption cycle has been completed, must be regenerated, in order to evacuate and/or release the adsorbed substance (water) and then be able to perform a new adsorption cycle.

In the dehumidification process of plastic resins, molecular sieves adsorb the moisture present in the process fluid during the adsorption cycle and release moisture into the environment during the regeneration cycle. In order to guarantee the continuity of the dehumidification process, it is known to use a double-bed adsorption system, in other words with at least two containers of molecular sieves, or dehumidification towers, arranged in parallel and operating alternately, i.e. alternating the adsorption cycles and regeneration cycles.

Each regeneration cycle includes a heating phase in which the molecular sieves release the adsorbed substances to a hot regeneration fluid. The heating phase can be controlled according to various known methods. In a first method (time control), the molecular sieves are heated for a predetermined fixed time. In a second method (temperature control), heating ends when a certain temperature of the sieves is reached. A third methodology (time and temperature control) is based on the achievement of one of the two conditions, or a given temperature or a predetermined time. In a fourth method (weight control), the sieves are heated until their weight becomes less than or equal to a certain value, for example the value measured at the beginning of the adsorption phase.

During the heating phase, the temperature of the molecular sieve mass increases as a function of the saturation percentage, that is the weight (for example in grams) of the substance adsorbed in relation to the weight (for example in kilograms) of the molecular sieve, whereby the temperature rise curve can take different forms depending on the saturation percentage. FIG. 1 shows, by way of example, a typical temperature trend of a molecular sieve in the heating step for a known dehumidifier. FIG. 1 shows the presence of a phase, called evaporation phase, during which the temperature of the sieve does not rise (in some cases it may even drop), due to the latent heat of evaporation, until complete evaporation. For the diffusion of heat in the mass of the molecular sieve, it is verified that the temperature begins to rise again only when all the mass of sieve has given up the adsorbed substance. At the end of the heating phase in the regeneration cycle, the quality of the air leaving the dehumidification tower, and consequently the relative dewpoint value, is on average between $-65°$ C. and $-80°$ C.

Once the heating phase has been completed, a subsequent cooling step is carried out, to remove the heat released during the heating phase, in order to return the sieve to the adsorption temperature. In this regard, it is known to cool with air sucked from the environment and sent to a cooling bank which through a fluid (generally water) reduces the air temperature to a predetermined value to guarantee the correct and complete cooling of the molecular sieve. As shown in FIG. 2 (graph obtained from commercial documentation of Grace Davison), it is observed that the adsorption capacity of a molecular sieve, used in the dehumidification process of plastic resins, is greater the lower the molecular sieve temperature. Then there is the need to cool the molecular sieve as much as possible. Generally, in the dehumidification process, the temperature at the end of the cooling phase is established between $60°$ C. and $65°$ C.

At the end of the cooling phase, depending on the dehumidifier's operating logic, the regeneration cycle may include a further phase, called "static", during which the molecular sieve, just regenerated, is isolated, remaining sealed without any passage or contact with the process circuit, or the sieve may be immediately reconnected to the process circuit.

FIG. 3 shows the temperature trend of the molecular sieve during a regeneration cycle, where it is possible to distinguish the initial heating phase and the subsequent cooling phase. An area of energy absorption due to latent heat of water evaporation is also observed.

The regeneration methods above described are limited and conditioned by the percentage of adsorption with respect to the maximum adsorption capacity of the molecular sieve. The molecular sieve mass, and therefore its absolute adsorption capacity, must be balanced by the mass of substance to be adsorbed, in order to guarantee the desired degree of dewpoint of the process fluid, according to the dehumidification request of the plastic resin. In particular, it can be stated that:

- a limit of the time control is that, to guarantee the complete regeneration of the sieve, a time equal to the complete saturation must be used, even if this is not reached, with consequent waste of energy and wear of the molecular sieve, due to stress thermal caused by heating and cooling;
- temperature control has the disadvantage that, if the percentage of adsorption is not complete, the temperature for complete regeneration is reached in less than necessary time, with a consequent imbalance between the duration of the adsorption cycles and the duration of the regeneration cycles;
- the time and temperature control represents a compromise that could limit some drawbacks of the previous methods, but which fails to fully solve the problem of ensuring the complete regeneration of the molecular sieve;
- the weight control is conditioned by the fact that, during the adsorption phase, the molecular sieve could adsorb not only the desired substance, i.e. water, but also other substances, with the consequence that the sieve is considered saturated, but saturation did not occur with the desired substance.

Furthermore, it can be observed that the dehumidification process carried out in a dehumidification system of the plastic granule by means of a molecular sieve presents some strongly energy-consuming and non-recoverable phases. One of these is the heating phase, where high-value energy must be spent to heat the regeneration fluid which will in turn heat the molecular sieve mass to ensure complete evaporation of the adsorbed water. During the heating phase, the outgoing fluid, containing moisture from the molecular sieve, must be released into the environment since it consists essentially of air saturated with humidity and therefore not usable in the dehumidification process. Another phase with high energy loss is the cooling phase where, due to the high regeneration temperatures (generally between 200° C. and 300° C.), it is not possible to use the fluid in the dehumidification process, as most of plastic resins is treated in the dehumidification and heating process with temperatures between 50° C. and 100° C.: hence the need to cool the molecular sieve up to temperatures of about 60-65° C.

In general, the management of a first heating phase and a second cooling phase, without or with minimal energy recovery, is very expensive. In particular, the management of two separate circuits, process and regeneration, on the one hand ensures against the risk of contaminating the resin dehumidification process with the fluid used for regeneration, on the other hand it involves a high energy consumption and a considerable complexity.

Another energy consumption is related to the sending of air to the molecular sieve, by means of appropriate blowers with side channels and/or fans and/or air flow generators, in the various phases to evacuate the adsorbed humidity or to cool the molecular sieve. In particular, the known dehumidifiers use a regeneration circuit, and therefore also a corresponding air flow generator (fan and/or side channel blower), separate from that of the process circuit.

SUMMARY OF THE INVENTION

One object of the invention is to provide a dehumidification method and/or apparatus that is alternative with respect to the prior art.

One object of the invention is to provide a method and/or apparatus capable of obviating one or more of the aforementioned limits and drawbacks of the prior art.

One object of the invention is to provide a dehumidification method and/or apparatus capable of improving the energy efficiency of the regeneration cycle of the means for dehumidifying the process fluid.

One advantage is to make available a dehumidification apparatus constructively simple and economical.

These objects and advantages, and others, are achieved by a method and/or an apparatus according to one or more of the claims below.

BRIEF DESCRIPTION OF THE DRAWINGS

The invention can be better understood and implemented with reference to the attached drawings which illustrate non-limiting examples of its implementation, in which:

FIG. 12 schematically shows the first distributor 5 of fluid of the apparatus of FIG. 4 in a first operative configuration;

DETAILED DESCRIPTION

Figure 1:
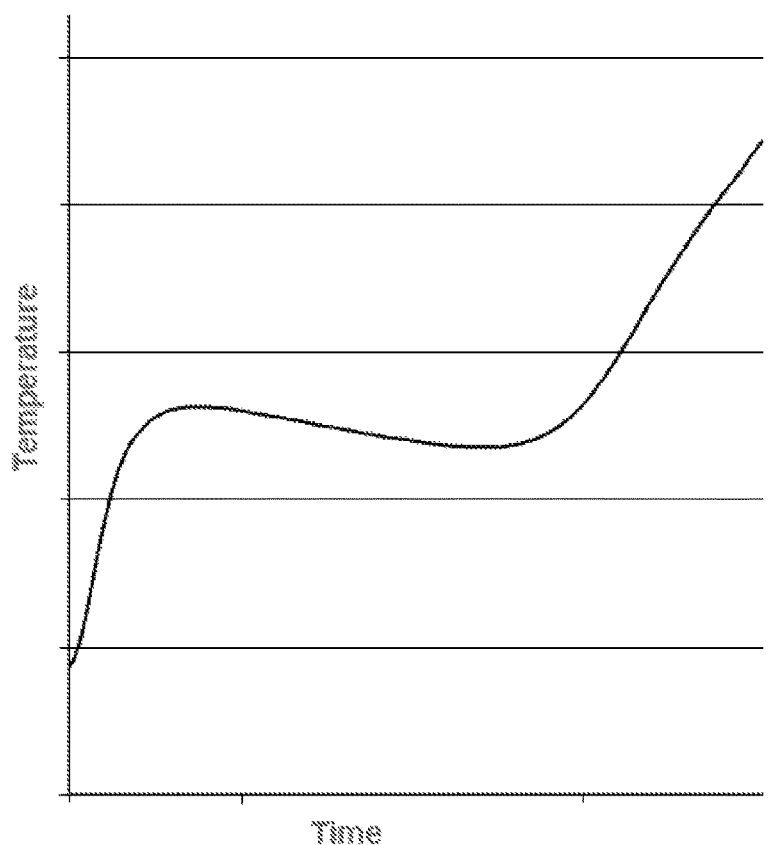
FIG. 1 is a graph indicative of the trend in time of the temperature of the molecular sieve mass of a dehumidification tower during the heating phase of the molecular sieve regeneration cycle.
Figure 2:
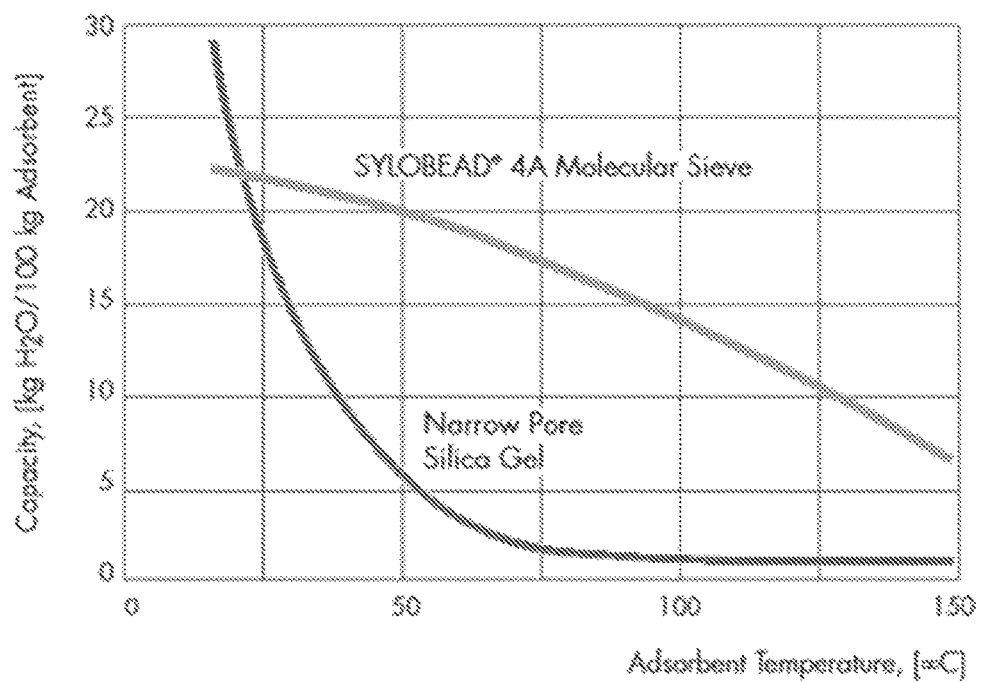
FIG. 2 is a graph of the adsorption capacity of a molecular sieve as a function of the molecular sieve temperature.
Figure 3:
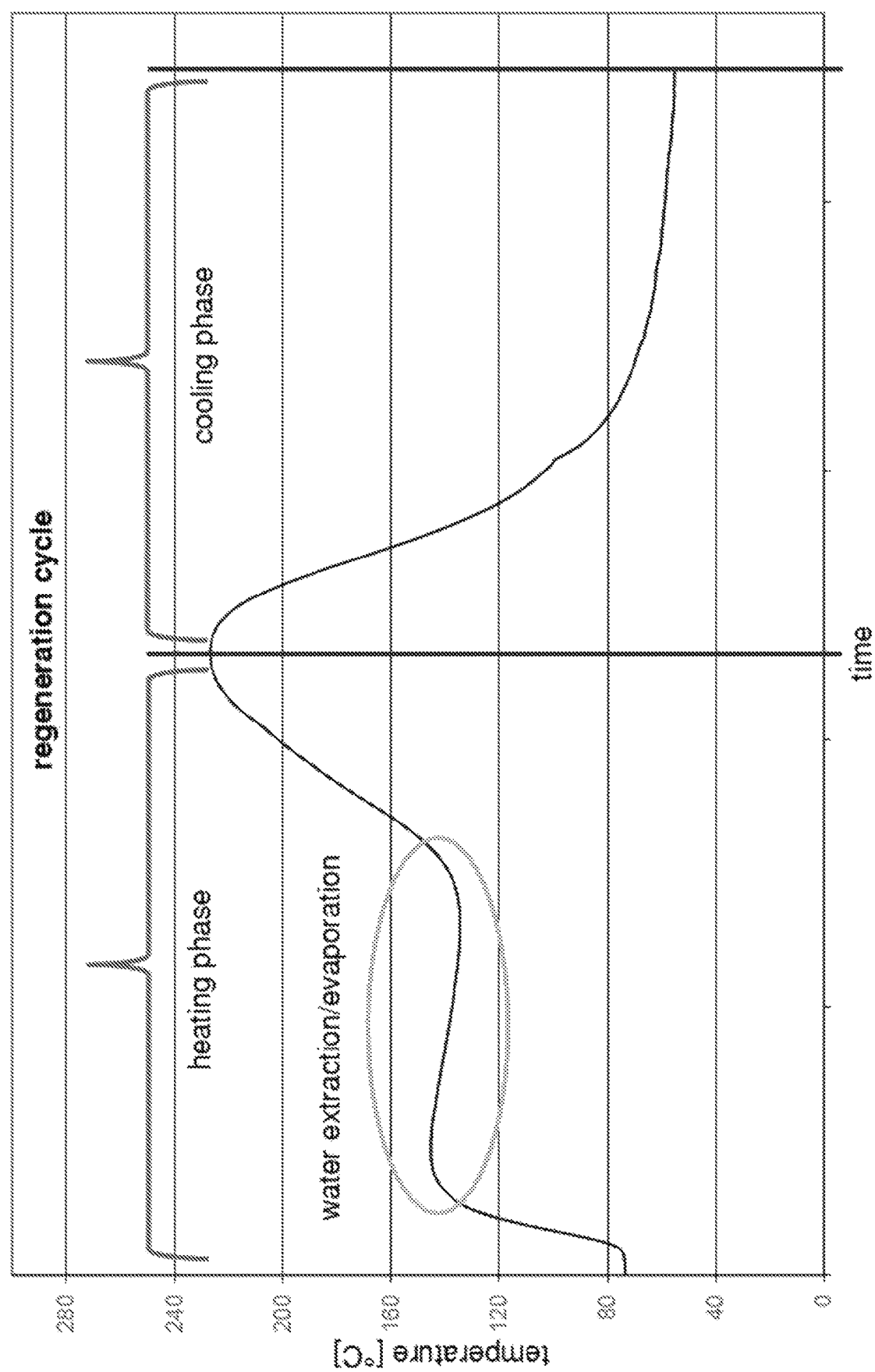
FIG. 3 is a graph of the temperature of the molecular sieve mass of a dehumidification tower in the regeneration cycle as a function of time.
Figure 4:
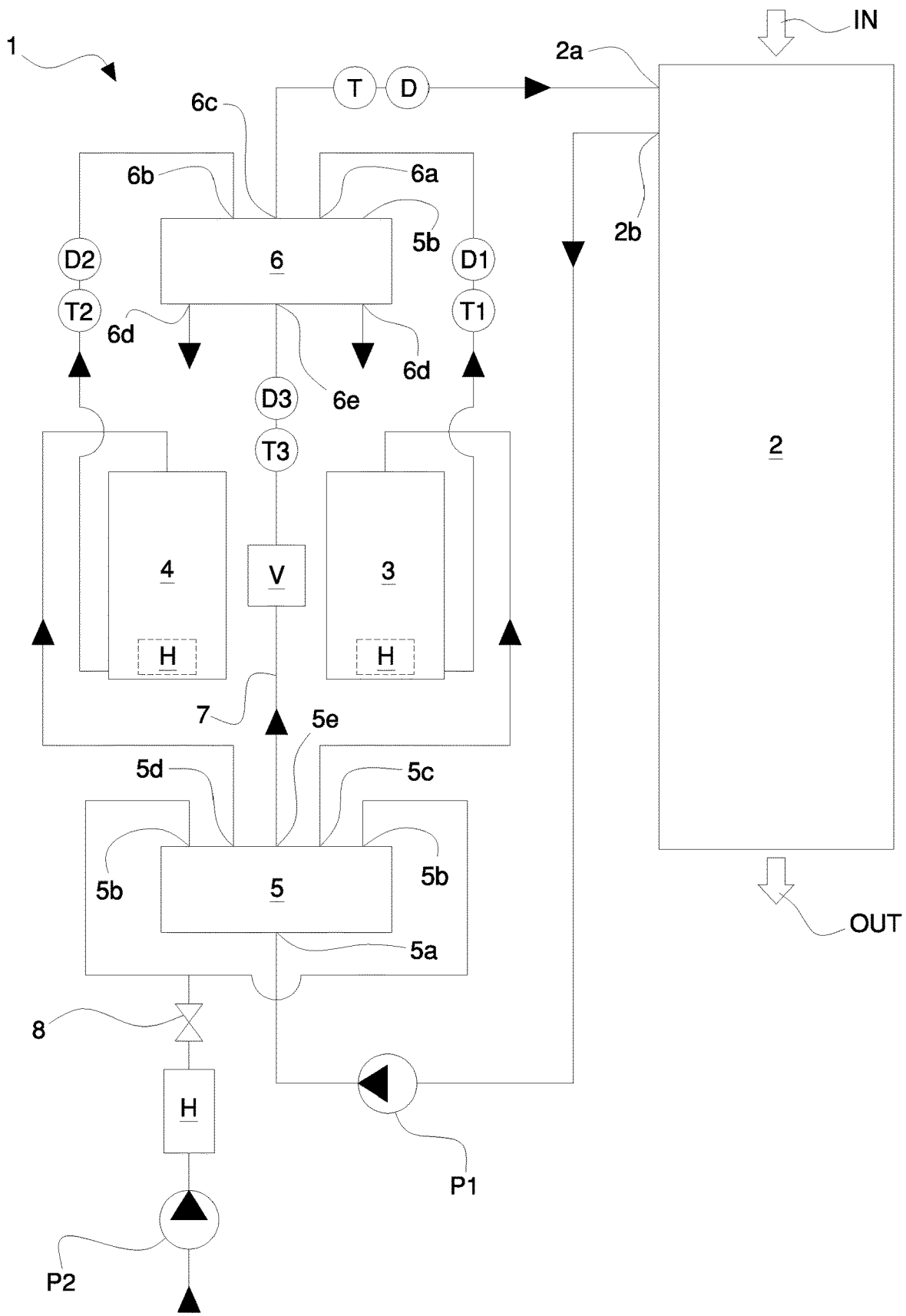
FIG. 4 is a diagram of an example of a dehumidification apparatus made in accordance with the present invention.

Legend:
- 1 dehumidification apparatus
- 2 container (plastic material dehumidification hopper)
- 3 first dehumidifier (molecular sieve tower)
- 4 second dehumidifier (molecular sieve tower)
- 5 first distributor (of process fluid and regeneration fluid)
  - 5a first inlet (of process fluid, i.e. humid air taken from the container 2)
  - 5b second inlet (of regeneration fluid, i.e. air taken from the environment and heated)
  - 5c first outlet (to the first dehumidifier 3)
  - 5d second outlet (to the second dehumidifier 4)
  - 5e auxiliary outlet (to the bypass line 7)
  - 51 first member (driven slider of the first distributor 5)
  - 52 second member (driven slider of the first distributor 5)
- 6 second distributor (of process fluid and regeneration fluid)
  - 6a third inlet (from the first dehumidifier 3)
  - 6b fourth inlet (from the second dehumidifier 4)
  - 6c third outlet (to the container 2)
  - 6d fourth outlet (discharge into the environment)
  - 6e auxiliary inlet (from the bypass line 7)
- 7 bypass line (of process fluid)
- 8 valve means (on-off valve of regeneration fluid)
- IN inlet of plastic material (polymer granule) in the container 2
- OUT outlet of plastic material (polymer granule) from the container 2
- E1 first driving means (motor of the first member 51)
- E2 second driving means (motor of the second member 52)
- H heater (source or generator of regeneration fluid)
- P1 first operating means (blower or fan for generating the flow of process fluid in the circuit)
- P2 second operating means (blower or fan for generating the flow of regeneration fluid in the circuit)
- T first sensor means (means for determining the temperature of the process fluid at the inlet of the container 2)
- D second sensor means (means for determining the dewpoint of the process fluid at the inlet of the container 2)
- T1 sensor means (for determining the temperature of the fluid leaving the first dehumidifier 3)
- D1 sensor means (for determining the dewpoint of the fluid leaving the first dehumidifier 3)
- T2 sensor means (for determining the temperature of the fluid leaving the second dehumidifier 4)
- D2 sensor means (for determining the dewpoint of the fluid leaving the second dehumidifier 4)
- T3 sensor means (for determining the temperature of the fluid being bypassed)
- D3 sensor means (for determining the dewpoint of the fluid being bypassed)
- V control valve (bypass of process fluid)
- M, M1, M2, M3 total flows (in mass or volume) of air and steam
- MV, MV1, MV2, MV3 flows (in mass or volume) of steam
- MT, MT1, MT2, MT3 thermal flows.

The reference number 1 indicates as a whole a dehumidification apparatus suitable, in particular, for dehumidifying and/or drying plastic material in incoherent format, for example in the form of granules and/or micro-granules and/or powder and/or flakes and/or other similar formats. The apparatus 1 may be used, in particular, for processing plastic material destined to feed user machines, in particular machines for processing and transforming plastic material, such as extrusion machines, and subsequently injection and/or blowing and/or compression molding machines.

The apparatus 1 may comprise, in particular, at least one container 2 for the dehumidification of incoherent plastic material. The container 2 may comprise, for example, a dehumidification hopper (for example of a known type) with at least one inlet IN of the plastic material to be dehumidified and at least one outlet OUT of the dehumidified plastic material.

The container 2 may comprise, in particular, at least one inlet 2a and at least one outlet 2b for a process fluid (air). The used (wet) process fluid can be taken from the outlet 2b, processed (dehumidified) and recirculated to return to the container 2 through the inlet 2a.

The apparatus 1 may comprise, in particular, at least one first dehumidifier 3 and at least one second dehumidifier 4 for dehumidifying the process fluid. The first dehumidifier 3 and the second dehumidifier 4 may be connected to the container 2. The first dehumidifier 3 and the second dehumidifier 4 may be arranged in parallel to one another for alternating process cycles (to retain the moisture contained in the process fluid) and regeneration cycles (to eliminate retained moisture). The first dehumidifier 3 may comprise, in particular, molecular sieve means. The second dehumidifier 4 may comprise, in particular, molecular sieve means. The first dehumidifier 3 and the second dehumidifier 4 may comprise, in particular, two molecular sieves towers (for example of a known type, of common use in plants for the dehumidification of plastic granules).

The apparatus 1 may comprise, in particular, circuit means configured for the circulation of the process fluid in the first dehumidifier 3 and/or in the second dehumidifier 4. The circuit means may comprise, as in this example, at least one circuit suitable for withdrawing the wet process fluid from the outlet 2b and returning the dehumidified process fluid to the inlet 2a. The circuit means may be configured for the circulation of a regeneration fluid (hot air, for example taken from the environment and heated), suitable for regenerating the first dehumidifier 3 and/or the second dehumidifier 4. The circuit means may comprise, as in this example, at least one line for withdrawing air from the environment (to then heat it and use it as a regeneration fluid) and at least one line for discharging the used regeneration fluid in the environment.

The apparatus 1 may comprise, in particular, means for regenerating the first dehumidifier 3 and/or the second dehumidifier 4 by heating with regeneration fluid (for example, as mentioned, hot air). The means for regenerating comprises, in particular, at least one source of a regeneration fluid connected to the circuit means for regenerating the first dehumidifier 3 and/or the second dehumidifier 4. The source of regeneration fluid may comprise, in particular, at least one heater H, for example an electric resistance heater. The heater H may be arranged on a fluid transport line located upstream of the dehumidifiers 3 and 4. In other examples it is possible to provide other arrangements of the heating means, in particular a first heater H operatively associated (for example integrated) with the first dehumidifier 3 and/or a second heater H operatively associated (for example integrated) with the second dehumidifier 4. The means for regenerating comprises, in particular, at least one regeneration circuit with at least one fluid supply and at least one fluid discharge. The fluid supply may include, in particular, at least one inlet for withdrawing air from the environment.

The fluid discharge may include, in particular, at least one outlet for discharging into the environment.

The apparatus 1 may comprise, in particular, flow distribution means arranged in the circuit means and configured to distribute the process fluid and/or the regeneration fluid to the first dehumidifier 3 and/or to the second dehumidifier 4 in a controlled manner. The fluid distribution means may comprise, in particular, at least one first distributor 5 of fluid arranged in the circuit means (upstream of the first dehumidifier 3 and/or upstream of the second dehumidifier 4). The fluid distribution means may comprise, in particular, at least one second distributor 6 of fluid arranged in the circuit means (downstream of the first dehumidifier 3 and/or downstream of the second dehumidifier 4).

Figure 5:
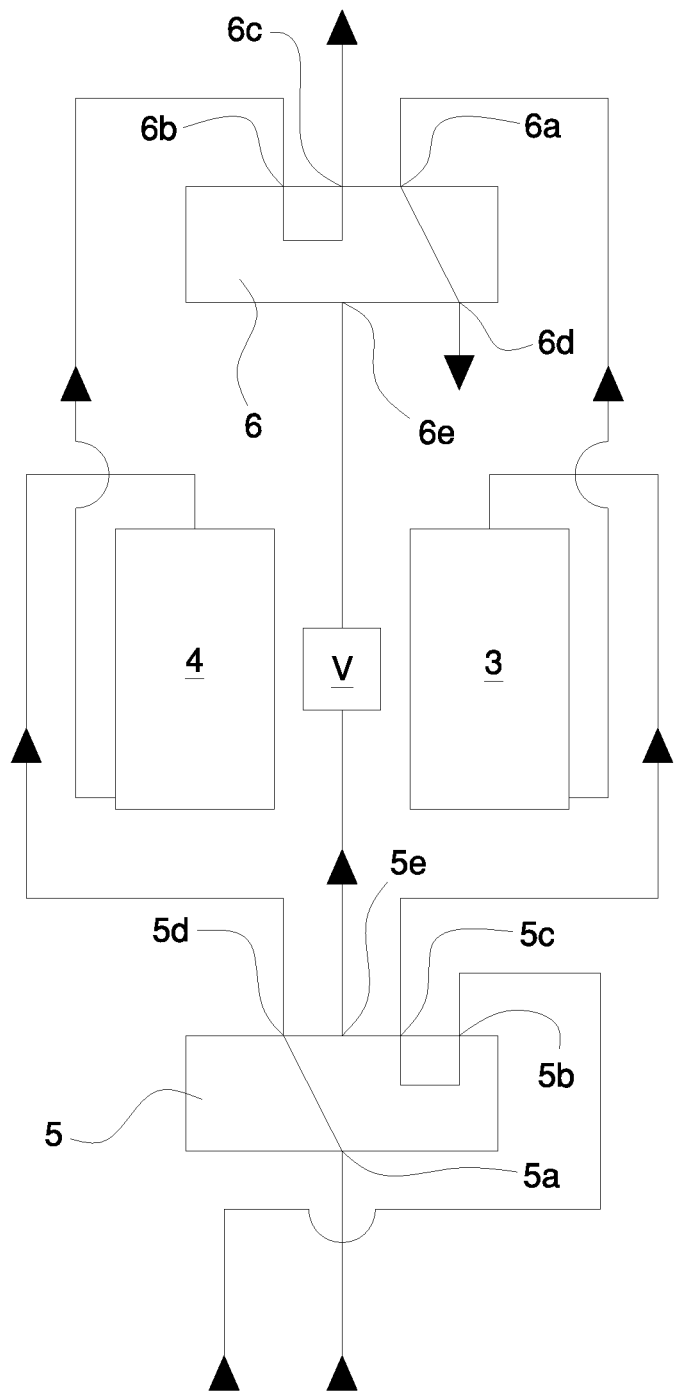
FIG. 5 shows a step in the operation of the apparatus of FIG. 4 in which the first dehumidifier 3 is in a heating phase of the regeneration cycle and the second dehumidifier 4 is in a process phase (adsorption) in which it dehumidifies the process fluid coming from the container 2.
Figure 6:
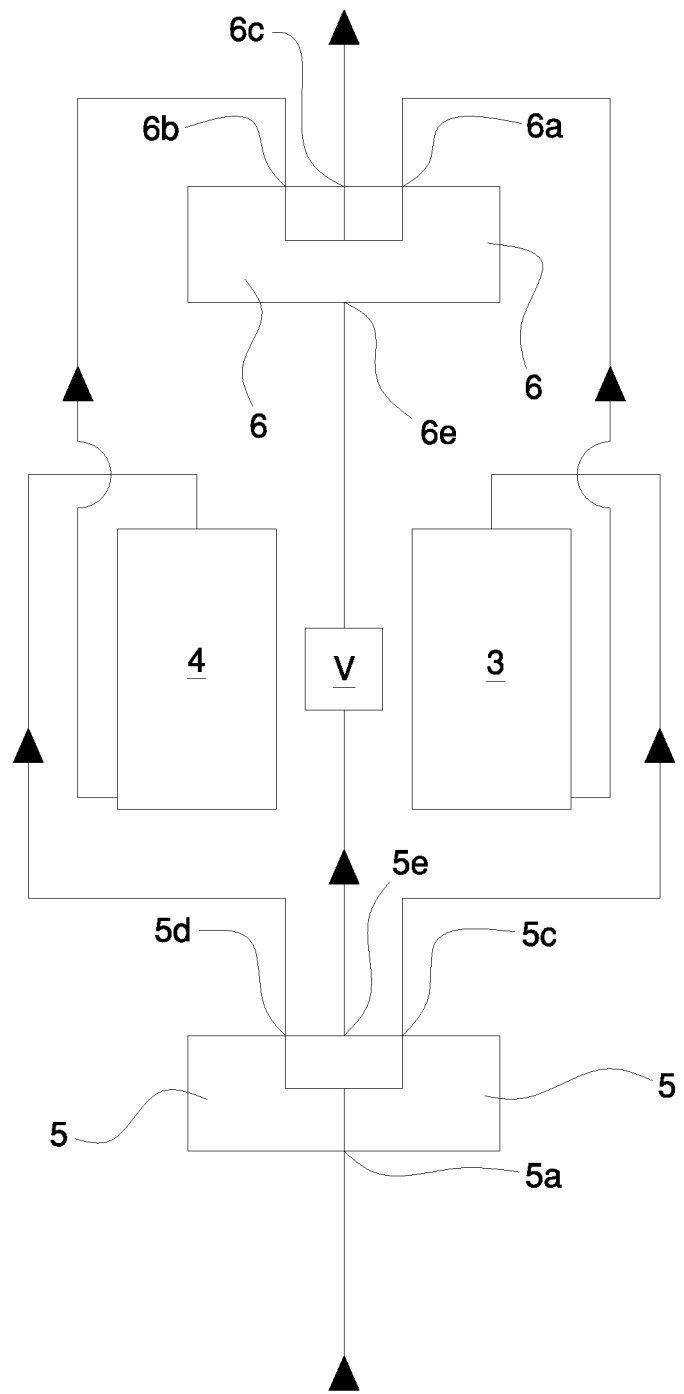
FIG. 6 shows a step in the operation of the apparatus of FIG. 4 in which the first dehumidifier 3 that has been regenerated by heating is in a cooling phase by means of the process fluid coming from the container 2 and the second dehumidifier 4 continues the process phase (adsorption) in which it dehumidifies the process fluid.
Figure 7:
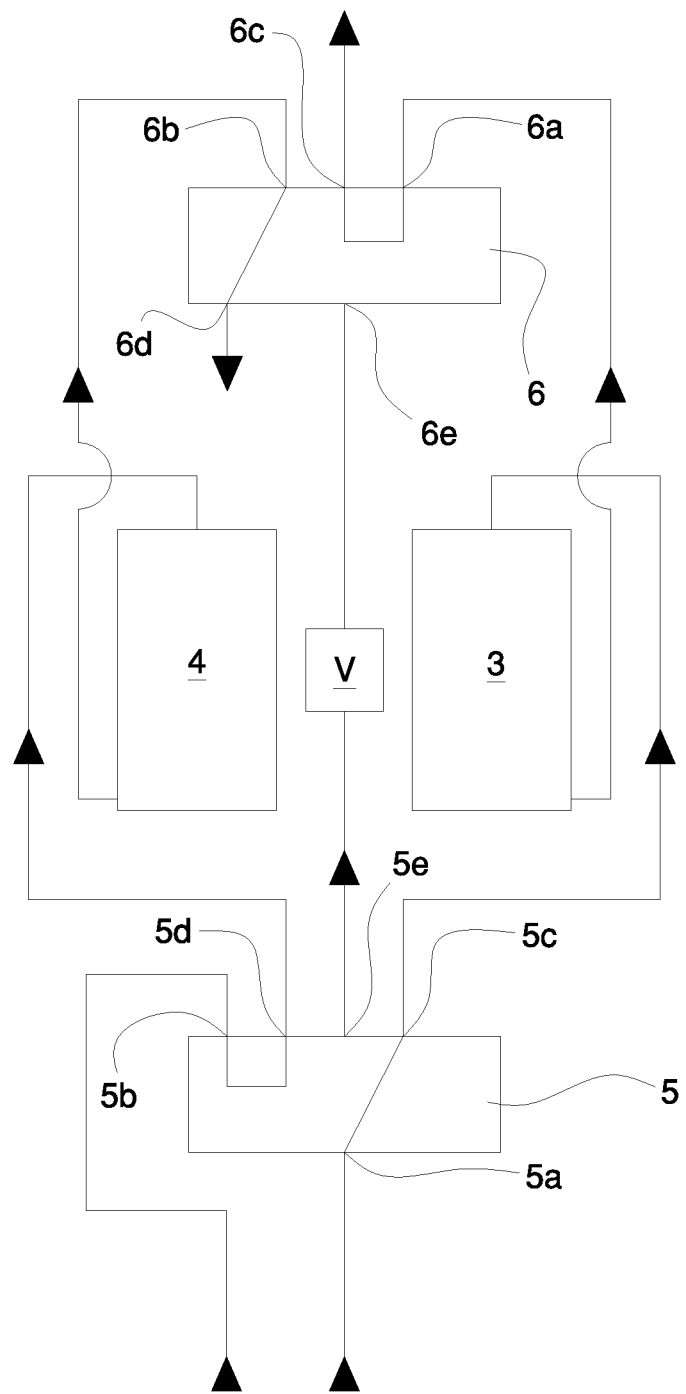
FIG. 7 shows a step in the operation of the apparatus of FIG. 4 in which the first dehumidifier 3 is in a process phase (adsorption) in which it dehumidifies the process fluid coming from the container 2 and the second dehumidifier 4 is in a heating phase of the regeneration cycle.
Figure 13:
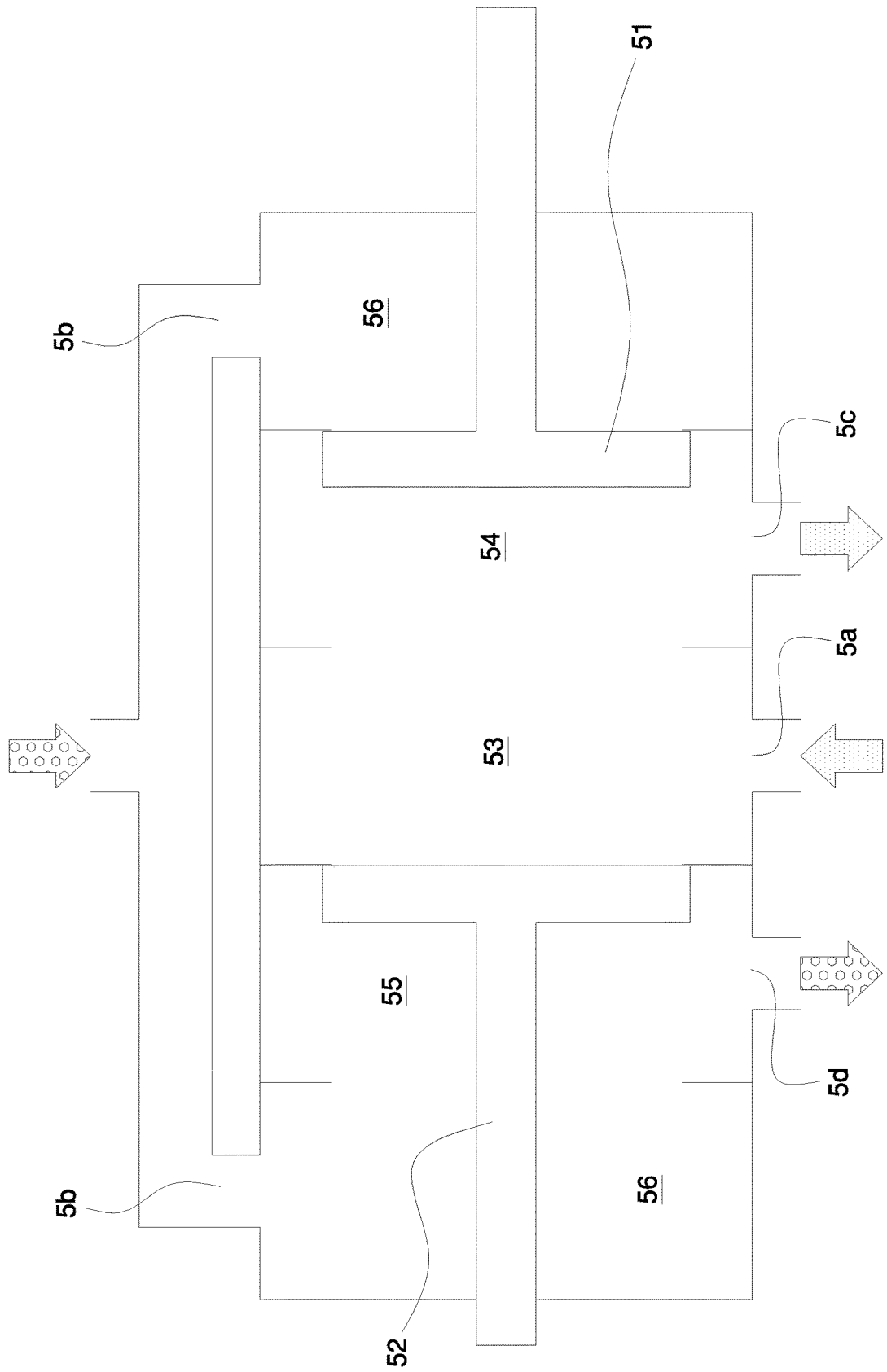
FIGS. 13 and 14 schematically show the first distributor 5 of FIG. 12 in two different operating configurations.
Figure 14:
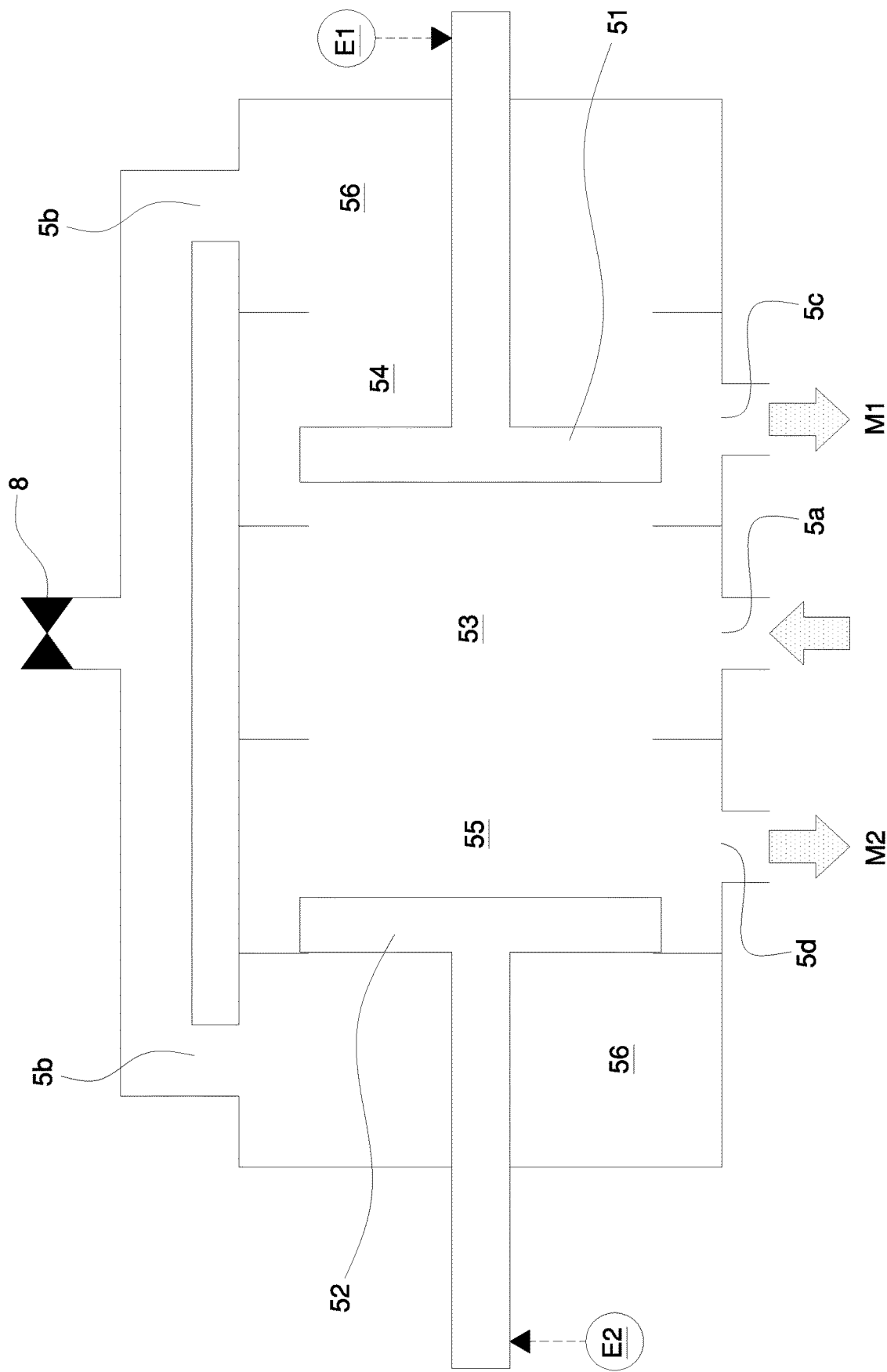

The flow distribution means may assume, in particular, at least one first configuration (FIG. 7 or FIG. 13) in which the process fluid can pass through the first dehumidifier 3 and not through the second dehumidifier 4 and the regeneration fluid can pass through the second dehumidifier and not through the first dehumidifier 3. The flow distribution means may assume, in particular, at least one second configuration (FIG. 5 or FIG. 12) in which the process fluid can pass through the second dehumidifier 4 and not through the first dehumidifier and the regeneration fluid can pass through the first dehumidifier 3 and not through the second dehumidifier 4. The flow distribution means may assume, in particular, at least one third configuration (FIG. 6 or FIG. 14) in which the regeneration fluid cannot pass either through the first dehumidifier 3, or through the second dehumidifier 4, and the process fluid can pass both through the first dehumidifier 3 (first part of the process fluid) and through the second dehumidifier 4 (second part of the process fluid).

The apparatus 1 may comprise, in particular, first sensor means T for detecting at least one first chemical-physical parameter of the process fluid that enters the container 2. The apparatus 1 may comprise, in particular, (electronic and programmable) control means configured to control the flow distribution means based on the aforementioned parameter detected by the first sensor means T, so as to vary the quantitative ratio between a flow of process fluid passing through the first dehumidifier 3 and a flow of process fluid passing through the second dehumidifier 4 (in particular when the flow distribution means is in the third configuration).

Figure 8:
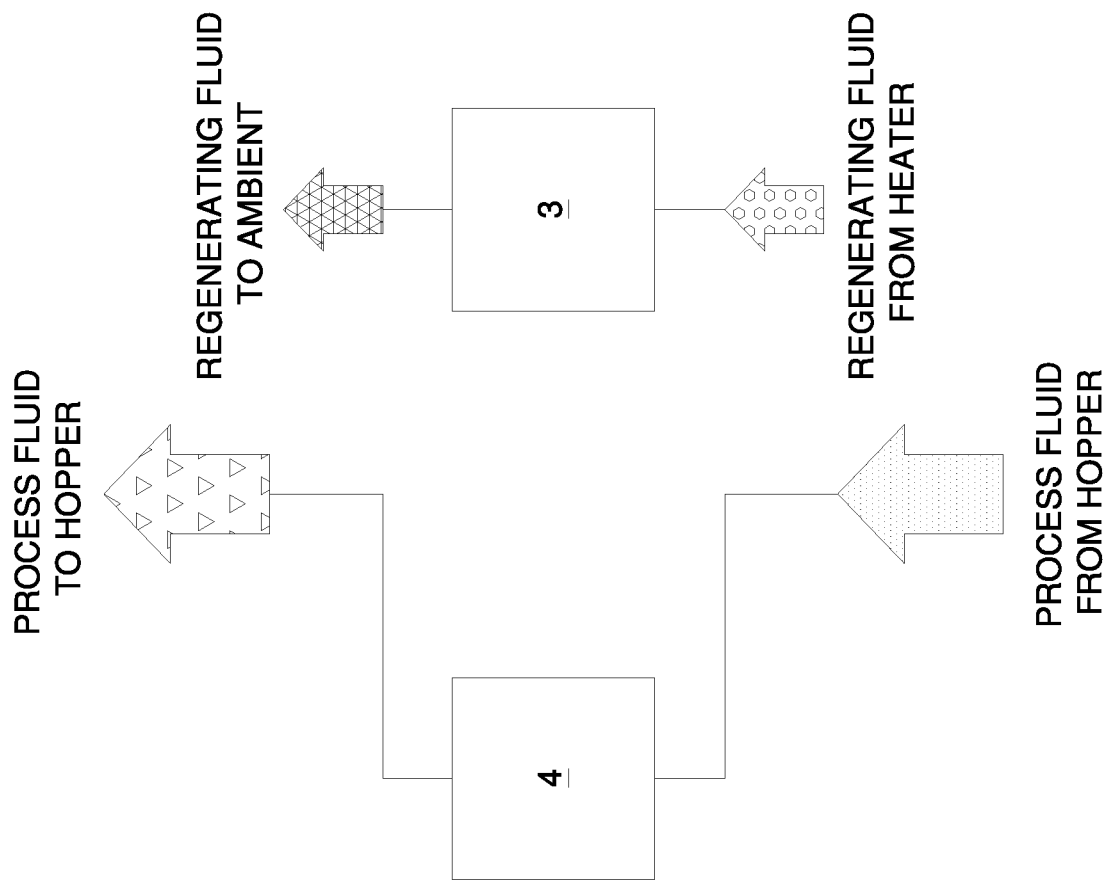
FIG. 8 schematically represents the step of FIG. 5.

The control means may be configured, in particular, to perform at least one first regeneration (heating) phase of the first dehumidifier 3, in which the hot regeneration fluid passes through the first dehumidifier 3 and the process fluid passes through the second dehumidifier 4 (FIG. 8). The control means may be configured, in particular, to perform at least one second regeneration (cooling) phase of the first dehumidifier 3 in which a part of the process fluid passes through the second dehumidifier 4 while another part of the process fluid passes through the first dehumidifier 3 so as to cool it (FIG. 6, or FIG. 9, or FIG. 10, or FIG. 14). The flow distribution means may be controlled, in particular, on the basis of the parameter detected by the sensor means T, in order to control the second regeneration (cooling) phase of the first dehumidifier 3.

The apparatus 1 may comprise, in particular, first operating means P1 for generating the flow of the process fluid in the circuit. The first operating means P1 may comprise, in particular, a blower (for example a blower with side channels), or a fan, or other flow generator. The first operating means P1 may take the used process fluid (humid air) from the container 2 and, through the process fluid circuit, send the used process fluid to the molecular sieves which dehumidify the fluid.

The apparatus 1 may comprise, in particular, second operating means P2 for generating the flow of the regeneration fluid in the circuit. The second operating means P2 may comprise, in particular, a blower (for example a blower with side channels), or a fan, or other flow generator. The second operating means P2 may suck air from the environment and, through the regeneration fluid circuit, send the air to the heater H which raises the temperature to a predetermined value to ensure the desired regeneration of the molecular sieves.

The first distributor 5 may comprise, in particular, at least one first inlet 5a connected to the outlet 2b of the container 2. The first distributor 5 may comprise, in particular, at least one second inlet 5b connected to the source of the regeneration fluid (line for withdrawing from the environment with second operating means P2 and heater H). The first distributor 5 may comprise, in particular, at least one first outlet 5c connected to the first dehumidifier 3. The first distributor 5 may comprise, in particular, at least one second outlet 5d connected to the second dehumidifier 4. The first distributor 5 may comprise, in particular, at least one first movable member 51 (adjustment slider or shutter) which puts the first outlet 5c selectively in communication with the first inlet 5a or with the second inlet 5b. The first distributor 5 may comprise, in particular, at least one second movable member 52 (adjustment slider or shutter) which puts the second outlet 5d in communication selectively with the first inlet 5a or with the second inlet 5b. The first member 51 and the second member 52 may, in particular, be operated independently of one another (by means of two independent actuating means E1 and E2).

The (electronic programmable) control means of the apparatus 1 may be configured, in particular, to control the first member 51 and/or the second member 52 so as to assume at least one configuration (for example as in FIG. 14) in which the first inlet 5a simultaneously communicates both with the first outlet 5c and the second outlet 5d, so that a first part of the wet process fluid coming from the container 2 can circulate in the first dehumidifier 3, while a second part of the wet process fluid coming from the container 2 can circulate in the second dehumidifier 4. The first member 51 and/or the second member 52 may each assume a plurality of configurations so as to allow a (relatively precise and fine) regulation of the flows through the two respective dehumidifiers 3 and 4.

The control means may be configured to control the first member 51 and/or the second member 52 according to the first parameter so as to vary the ratio between the first part of wet process fluid circulating in the first dehumidifier 3 and the second part of wet process fluid circulating in the second dehumidifier 4. The first parameter may comprise, in particular, the temperature of the fluid. The first parameter may comprise, in particular, the dewpoint of the fluid, or its relative humidity, or its absolute humidity.

It is possible to provide that the first movable member 51 is able to assume at least one first position (FIG. 12) in which it closes a communication between the first outlet 5c and the first inlet 5a and allows a communication between the first outlet 5c and the second inlet 5b. It is possible to provide that the first movable member 51 is able to assume at least one second position (FIG. 13) in which it closes a communication between the first outlet 5c and the second inlet 5b and opens a communication between the first outlet 5c and the first inlet 5a. It is possible to provide that the second movable member 52 is able to assume at least one first position (FIG. 13) in which it closes a communication between the second outlet 5d and the first inlet 5a and allows a communication between the second outlet 5d and the second inlet 5b. It is possible to provide that the second movable member 52 is able to assume at least one second position (FIG. 12) in which it closes a communication between the second outlet 5d and the second inlet 5b and opens a communication between the second outlet 5d and the first inlet 5a.

The first distributor 5 may comprise, in particular, at least one central chamber 53 communicating with the first inlet 5a. The first distributor 5 may comprise, in particular, at least one first intermediate chamber 54 communicating with the first outlet 5c. The first distributor 5 may comprise, in particular, at least one second intermediate chamber 55 communicating with the second outlet 5d. The first distributor 5 may comprise, in particular, at least two end chambers 56, both communicating with the second inlet 5b. The first intermediate chamber 54 may be, for example, connected on one side to the central chamber 53 and on the opposite side to one of the two end chambers 56. The second intermediate chamber 55 may be, for example, connected on one side to the central chamber 53 and on the opposite side to the other of the two end chambers 56. The first member 51 may be, in particular, movable in the first intermediate chamber 54. The second member 52 may be, in particular, movable in the second intermediate chamber 55.

The first member 51 may, in particular, be driven by first driving means E1 (for example with a proportional control). The second member 52 may, in particular, be driven by second driving means E2 (for example with a proportional control). The first driving means E1 and the second driving means E2 may be, in particular, independent of each other.

The second distributor 6 of fluid may comprise, in particular, at least one third inlet 6a connected to the first dehumidifier 3. The second distributor 6 may comprise, in particular, at least one fourth inlet 6b connected to the second dehumidifier 4. The second distributor 6 may comprise, in particular, at least one third outlet 6c connected to the inlet 2a of the container 2. The second distributor 6 may comprise, in particular, at least one fourth outlet 6d connected to a discharge of the regeneration fluid. The second distributor 6 may comprise, in particular, at least one third movable member (not shown) which communicates the third inlet 6a selectively with the third outlet 6c or with the fourth outlet 6d. The second distributor 6 may comprise, in particular, at least one fourth movable member (not shown) which communicates the fourth inlet 6b selectively with the third outlet 6c or the fourth outlet 6d. The third member and the fourth member may be driven independently of one another. The second distributor 6 of fluid may comprise, in particular, a structure comprising two movable members and five communicating chambers, similarly to the structure of the first distributor 5.

The circuit means may comprise, in particular, at least one bypass line 7 which allows the wet process fluid to bypass the first dehumidifier 3 and the second dehumidifier 4. The circuit means may comprise, in particular, at least one control valve V which controls the flow in the bypass line 7. The control valve V may comprise, for example, a proportional-command valve controlled by third driving means (not shown) independent of the first driving means E1 and the second driving means E2.

The bypass line 7 may connect, in particular, an auxiliary outlet 5e of the first distributor 5 with an auxiliary inlet 6e of the second distributor 6. The auxiliary outlet 5e may be, in particular, communicating with the first inlet 5a of the first distributor 5. The auxiliary outlet 5e may be, in particular, communicating with the central chamber 53 of the first distributor 5. The auxiliary inlet 6e may be, in particular, communicating with the third outlet 6c of the second distributor 6. The auxiliary inlet 6e may be, in particular, communicating with a central chamber of the second distributor 6.

The apparatus 1 may comprise, in particular, second sensor means D for determining at least one second parameter of the fluid that enters the container 2. The control means of the apparatus 1 may be configured, in particular, to control the control valve V according to the second parameter. The second sensor means D may comprise, in particular, humidity sensor means, for example at least one absolute humidity sensor and/or at least one relative humidity sensor. The second parameter may comprise, in particular, the fluid dewpoint (which can be determined, as is known, based on the humidity and temperature of the fluid), or another parameter linked to the water vapor ratio of the fluid.

The apparatus 1 may comprise, in particular, valve means 8 arranged to close the communication (for example as in the situation of FIG. 14) between the source of the regeneration fluid (heater H) and the second inlet 5b. The (programmable electronic) control means of the apparatus 1 may be configured, in particular, to control the valve means 8. The programmable electronic control means of the apparatus 1 may be configured, in particular, to control the means for regenerating the dehumidifiers on the basis of the dewpoint determined by the second sensor means D. In particular, the programmable electronic control means may be configured to interrupt a sending of regeneration fluid to the first dehumidifier 3 when the aforesaid dewpoint (determined by the second sensor means D) is equal to or less than a predetermined value. In particular, the programmable electronic control means may be configured to send at least one part of the regeneration fluid leaving the first dehumidifier 3 to the container 2 when the dewpoint is equal to or less than a predetermined value.

The apparatus 1 may comprise, in particular, flow sensor means for measuring the flow M (in mass or in volume) of the fluid that enters the container 2. These flow sensor means may comprise, for example, at least one flowmeter (not shown). Such sensor means of the flow M may be arranged, in particular, between the mixing zone of the fluids downstream of the dehumidifiers 3 and 4 and the inlet 2a of the container 2. The apparatus 1 may comprise, in particular, flow sensor means for measuring the flows M1, M2 and M3 (in mass or in volume) of the first, second and third part of the process fluid. The sensor means of the flow M1 may be arranged, in particular, downstream of the first dehumidifier 3. The sensor means of the flow M2 may be arranged, in particular, downstream of the second dehumidifier 4. The sensor means of the flow M3 may be arranged, in particular, in the bypass line 7. The sensor means of the flows M1, M2 and M3 may comprise, for example, flow meters (not shown).

The operation of the apparatus 1 allows to implement at least one dehumidification method which may comprise the following phases.

The wet process fluid may be taken from the container 2 and sent to the first dehumidifier 3 (tower in adsorption process phase), using the first operating means P1. The process fluid returns dehumidified by the first dehumidifier 3 to the container 2. After this operative step, the first dehumidifier 3 may be regenerated by heating with the hot regeneration fluid (tower in regeneration phase). The regeneration fluid may comprise, as in this example, air taken from the environment by the second operating means P2 and heated by the heater H. During this heating phase of the first dehumidifier 3, it is possible to provide an operative phase (adsorption) of the second dehumidifier 4, in which the wet process fluid is taken from the container 2 and sent to the second dehumidifier 4. The process fluid returns dehumidified by the second dehumidifier 4 to the container 2. This situation is shown in FIG. 8, where the first dehumidifier 3 is the tower in the regeneration phase while the second dehumidifier 4 is the tower in the process phase.

Figure 10:
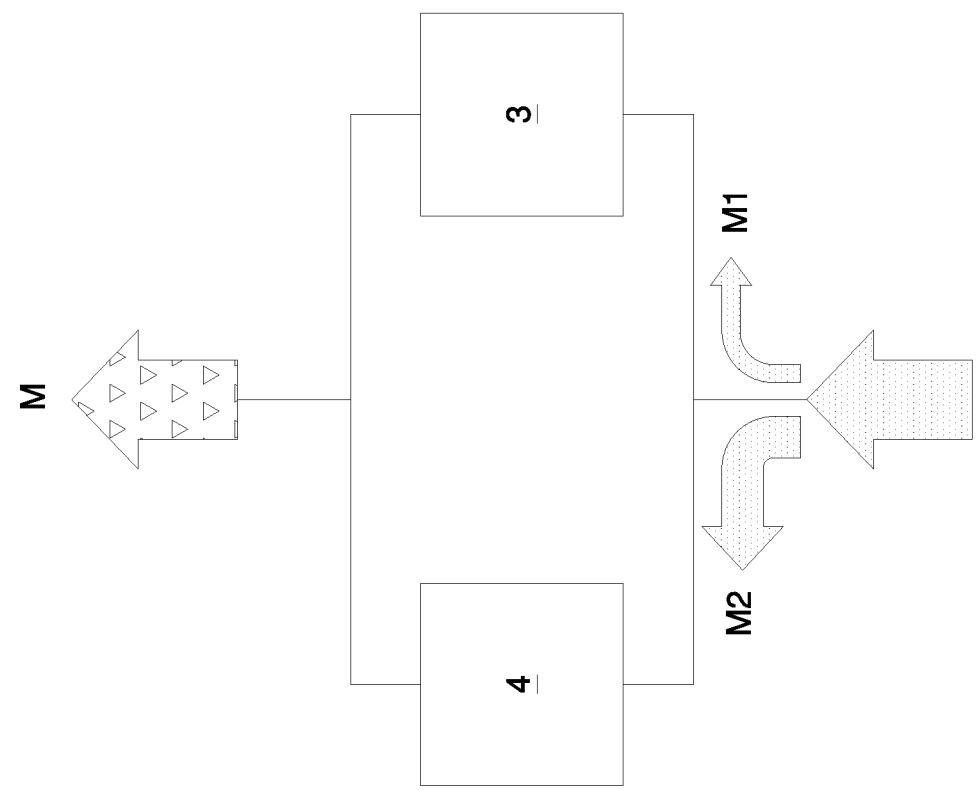

After the heating phase of the first dehumidifier 3, it is possible to provide a cooling phase of the first dehumidifier 3 in which a first part (with flow equal to M1) of the wet process fluid taken from the container 2 is sent to the first dehumidifier 3 to cool it and a second part (with flow equal to M2) is sent to the second dehumidifier 4 to continue the operating phase of water vapor adsorption process (FIG. 10).

The first part of process fluid which comes out (heated) from the first dehumidifier 3 is mixed with the second part of process fluid which comes out (dehumidified) from the second dehumidifier 4. The mixture (of flow M1+M2) is then sent to the inlet 2a of the container 2.

The flow M1 of the first part and/or the flow M2 of the second part of process fluid is regulated according to a chemical-physical parameter of the mixture. This chemical-physical parameter may comprise, in particular, the temperature and/or dewpoint (or absolute humidity, or relative humidity) of the mixture, for example measured with the first sensor means T and/or with the second sensor means D.

Figure 9:
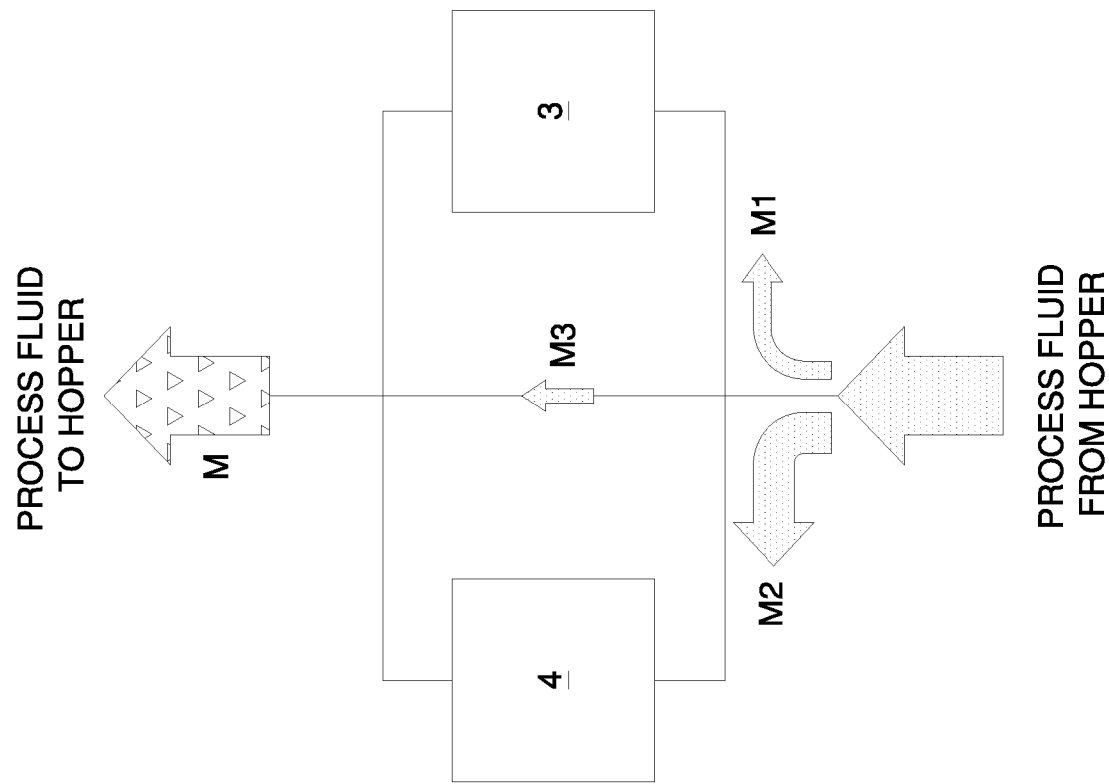
FIG. 9 schematically represents a step of the operation of the apparatus of FIG. 4 in which the first dehumidifier 3 that has been regenerated is in a cooling step by means of the process fluid coming from the container 2, the second dehumidifier 4 continues the process step (adsorption) in which it dehumidifies the process fluid and a part of the process fluid bypasses both the first dehumidifier 3 and the second dehumidifier 4.
Figure 11:
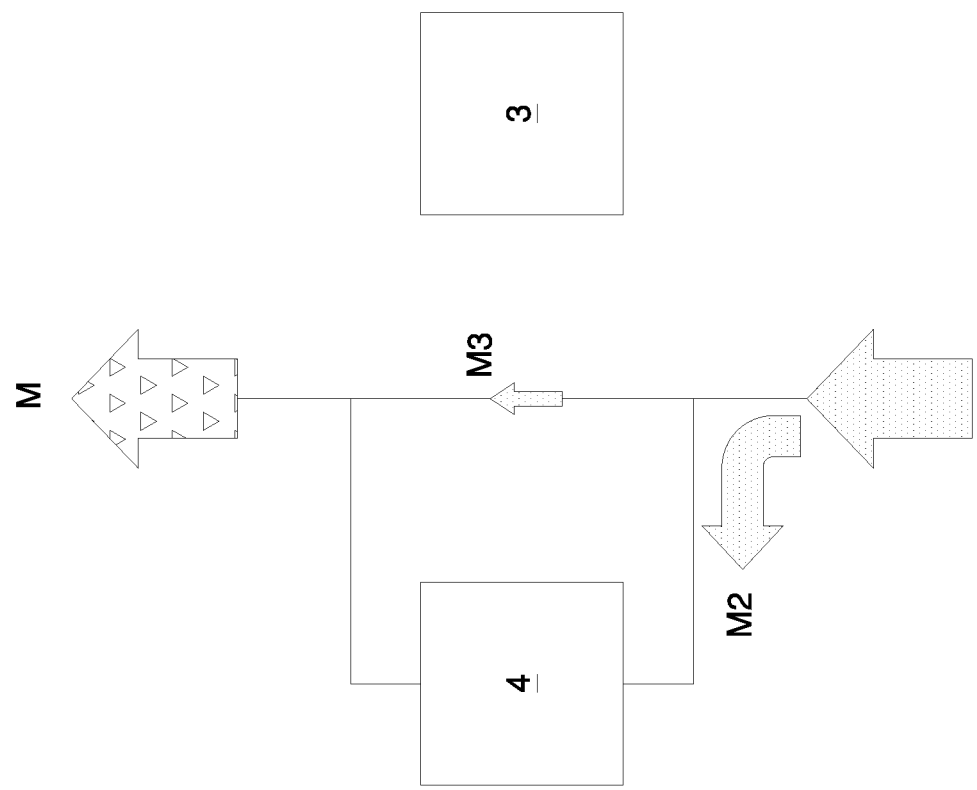
FIGS. 10 and 11 schematically represent two other possible phases of the operation of the apparatus of FIG. 4.

It is possible to provide that a third part (with flow equal to M3) of wet process fluid, taken from the container 2, returns to the container 2 without passing through the first dehumidifier 3, or through the second dehumidifier 4 (FIG. 9 or FIG. 11). The third part of process fluid may pass through the bypass line 7. The third part of process fluid, before returning to the container 2, may be mixed with the first and the second part of process fluid. The mixture (of flow M1+M2+M3) is then sent to the inlet 2a of the container 2.

The flow M3 of the third part of wet process fluid may be adjusted according to a chemical-physical parameter of the mixture of the first, second and third part of process fluid. This chemical-physical parameter may comprise, in particular, the temperature and/or dewpoint (or absolute humidity, or relative humidity) of the mixture, for example measured with the first sensor means T and/or with the second sensor means D.

It is possible to repeat the operating cycle described above, reversing the flows between the first dehumidifier 3 and the second dehumidifier 4 (inversion between the tower in the process phase and the tower in the regeneration phase), with the possibility of repeating the operative cycles alternating between the two dehumidifiers 3 and 4 for two, three, or more times. It is therefore possible to take the wet process fluid from the container 2 and send it to the second dehumidifier 4 and then return the dehumidified process fluid from the second dehumidifier 4 to the container 2, after which it is possible to regenerate the second dehumidifier 4 by heating with the regeneration fluid (while the wet process fluid is taken from the container 2 and sent to the first dehumidifier 3).

After heating the second dehumidifier 4, it is possible to take wet process fluid from the container 2 and send a first part thereof to the second dehumidifier 4 (to cool it) and a second part thereof to the first dehumidifier 3 (for the adsorption process).

Also in this case, the flow M1 of the first part of process fluid and/or the flow M2 of the second part of process fluid may be adjusted on the basis of a chemical-physical parameter of the mixture, which may comprise, in particular, the temperature of the mixture, for example measured with the first sensor means T, and/or the dewpoint (or absolute humidity, or relative humidity), for example measured with the second sensor means D.

It is further possible, also in this case, to provide that a third part (with flow M3) of wet process fluid, taken from the container 2, returns to the container 2 without passing either through the first dehumidifier 3, or through the second dehumidifier 4, but through the bypass line 7. The third part of process fluid, before returning to the container 2, may be mixed with the first and with the second part of process fluid and the flow M3 of the third fluid part of wet process may be adjusted based on a chemical-physical parameter of the mixture of the first, second and third part of process fluid, which may comprise, in particular, the temperature and/or dewpoint (or absolute humidity, or relative humidity) of the mixture that goes to container 2 (with flow M=M1+M2+M3).

The regulation system may provide, for example, to increase the flow (M1 or M2) of the wet process fluid which passes through the hot dehumidifier just regenerated, if the temperature of the mixture is lower than the desired temperature and/or to increase the flow M3 of the wet process fluid that passes through the bypass line 7 if the dewpoint of the mixture is lower than the desired dewpoint.

In particular, it is possible to provide (considering, for example, that the dehumidifier in the regeneration phase just heated by the regeneration fluid is the first dehumidifier 3) that the flow M1 of the first part of the process fluid (through the first dehumidifier 3 just heated), the flow M2 of the second part of the process fluid (through the second dehumidifier 4 which is operative to adsorb moisture) and the flow M3 of the third part of the process fluid (through the bypass line 7) are determined so as to obtain a desired dewpoint (or desired absolute humidity, or desired relative humidity), a desired temperature and a desired flow M of the mixture of the three fluids returning to the container 2.

The three flows M1, M2, M3 may be determined by solving a system of equations (in particular three equations) which may include at least one energy balance equation and at least two mass balance equations.

The aforementioned two mass balance equations may be two equations included in the following group of equations: total mass balance equation of process fluid (dry fluid plus moisture), mass balance equation of only moisture or water vapor ratio, mass balance equation of dry fluid only. The aforementioned energy balance equation may include, for example, an enthalpy balance equation, i.e. considering that the mixing of fluids is adiabatic.

It is possible to provide that the three flows M1, M2 and M3 are determined by means of a calculation which uses determined (measured) values of the following parameters:
  temperature, dewpoint (or absolute humidity, or relative humidity) and flow (M1 or M2) of the part of fluid at the outlet of the respective dehumidifier (the one just heated) and before mixing;
  temperature, dewpoint and flow (M1 or M2) of the part of fluid at the outlet of the respective dehumidifier (the operating one, not hot, in the adsorption phase) and before mixing; and
  temperature, dewpoint and flow M3 of the third part of bypassed fluid and before mixing.

The aforementioned system of equations may comprise, for example, the following system of three equations (unknowns M1, M2, M3):

$$M = M1 + M2 + M3$$

$$MV = MV1 + MV2 + MV3$$

$$MT = MT1 + MT2 + MT3$$

M=flow (in mass or volume) of the total process fluid (dry air and water vapor) entering the container 2;
M1=flow (in mass or volume) of the total process fluid (dry air and water vapor) which passes through the first dehumidifier 3;
M2=flow (in mass or volume) of the total process fluid (dry air and water vapor) which passes through the second dehumidifier 4;
M3=flow (in mass or volume) of the total process fluid (dry air and water vapor) that passes through the bypass line 7;
MV=flow (in mass or volume) of the water vapor entering the container 2;
MV1=flow (in mass or volume) of the water vapor passing through the first dehumidifier 3;
MV2=flow (in mass or volume) of the water vapor passing through the second dehumidifier 4;
MV3=flow (in mass or volume) of the water vapor passing through the bypass line 7; MT=thermal flow (referred to the mass or volume) of the fluid (dry air and/or water vapor) entering the container 2;
MT1=thermal flow (referred to the mass or volume) of the fluid (dry air and/or water vapor) that passes through the first dehumidifier 3;
MT2=thermal flow (referred to the mass or volume) of the fluid (dry air and/or water vapor) which passes through the second dehumidifier 4;
MT3=thermal flow (referred to the mass or volume) of the fluid (dry air and/or water vapor) that passes through the bypass line 7.

The flows MV, MV1, MV2 and MV3 of water vapor may be determined, for example, as a function of the flows M, M1, M2, M3, of the dewpoint of the mixture, and of the dewpoint of the three fluids composing the mixture, in which each dewpoint may be determined, for example, as a function of the corresponding measured humidity value (absolute or relative).

To simplify, each flow of water vapor (for example the flow of water vapor MV of the mixture) could be defined, in particular, with the following formula (similarly for MV1, MV2, MV3):

$$MV = M*0{,}622*\phi*Psat/(Patm - \phi*Psat)$$

$\phi$=relative humidity (parameter that is measurable with the humidity sensor means and as a known function of the dewpoint);
Psat=water vapor saturation pressure (known value, function of the temperature);
Patm=atmospheric pressure.

To simplify, each thermal flow (for example the thermal flow MT of the mixture) could be defined, in particular, with the following formula (similarly for MT1, MT2, MT3):

$$MT = T*(MA*CA + MV*CV)$$

T=temperature of the fluid (dry air and/or water vapor);
MA=flow (in mass or volume) of dry air;
CA=specific heat of dry air;
MV=flow (in mass or volume) of water vapor;
CV=specific heat of water vapor.

After determining the flows M1, M2 and M3 (having set, in particular, as set point values the flow M of the mixture, the temperature T of the mixture and the dewpoint D of the mixture), the control means may regulate the distributors 5 and 6 (control of the first and second driving means E1 and E2) and the control valve V (control of the third driving means) so as to obtain the flows M1, M2 and M3 suitable for reaching the desired values of set point.

The two movable members 51 and 52 (sliders or shutters of the distribution means) are moved independently and autonomously with respect to each other and are controlled in position. Depending on the position assumed, the control determines the correct and exact amount of flow (mass and/or volumetric) to be sent to the dehumidifiers 3 and 4 and to the bypass line 7 (i.e. flows M1, M2, M3).

It is possible to provide a safety control step of the apparatus 1 in which the temperature of the part of process fluid at the outlet of the heated dehumidifier just treated with hot regeneration fluid (for example the first dehumidifier 3) is measured and, if this temperature is equal to or greater than a predetermined value (safety threshold), the corresponding flow (for example the flow M1) of the aforementioned part of the process fluid is brought to zero. For example, a safety control step of the apparatus 1 could also be envisaged for the other dehumidifier (the one operating to adsorb humidity, for example the second dehumidifier 4) in which the temperature of the part of the process fluid at the outlet of the other dehumidifier (for example the flow M2 in the second dehumidifier 4) is measured and, if this temperature is equal to or greater than a predetermined value (safety threshold), the flow of the aforementioned part of the process fluid is brought to zero.

It is possible to provide a safety control step of the apparatus 1 in which at least one chemical-physical parameter (temperature and/or dewpoint and/or humidity) of the third fluid part (flow M3 of bypassed fluid) is measured before of the mixing and, if this parameter is equal to (or is within a neighborhood of) a desired value of the same parameter (temperature and/or dewpoint and/or humidity) of the mixture which must return to the container 2, then the flows M1 and M2 through the two dehumidifiers 3 and 4 are brought to zero, i.e. the flows of the first part of fluid and the second part of fluid.

As we have seen, the control of the apparatus 1 may provide for canceling the flow M1 of the first part of wet process fluid and regenerating the first dehumidifier 3 by heating with the hot regeneration fluid and/or canceling the flow M2 of the second part of wet process fluid and regenerating the second dehumidifier 4 by heating with the hot regeneration fluid.

The control of the apparatus 1 may provide, in particular, to increase the flow M3 of the (bypassed) third fluid part if the measured dewpoint of the mixture, before returning to the container 2, results lower or equal to a desired dewpoint.

The control of the apparatus 1 may provide, in particular, to regenerate one of the two dehumidifiers (for example the second dehumidifier 4) by sending hot regeneration fluid and therefore to interrupt such sending of regeneration fluid (to the second dehumidifier 4), and after that—i.e. after the dehumidifier (the second dehumidifier 4) has been heated by the regeneration fluid—the flow of the wet process fluid through this dehumidifier (for example the flow M2 of the second fluid part) is increased if the temperature of the mixture before returning to the container 2 is lower or equal to a desired temperature of the mixture.

Similarly, the control of the apparatus 1 may provide, in particular, to regenerate the other of the two dehumidifiers (for example the first dehumidifier 3) by sending hot regeneration fluid and therefore to interrupt such sending of regeneration fluid (to the first dehumidifier 3), and after that—i.e. after this dehumidifier (the first dehumidifier 3) has been heated by the regeneration fluid—the flow of the wet process fluid through this dehumidifier (for example the flow M1 of the first part of fluid) is increased if the temperature of the mixture before returning to the container 2 is lower or equal to a desired temperature of the mixture.

The control means of the apparatus 1 may be configured to control the heating phase of the dehumidifier 3 or 4 which, in each case, is in the regeneration cycle. This control may comprise, in particular, the following steps, considering, for example, that the dehumidifier in the heating phase is the first dehumidifier 3. After the first dehumidifier 3 has finished the operative phase, in which it has absorbed moisture from the wet process fluid taken from the container 2, the regeneration cycle can begin in which the first dehumidifier 3 is crossed by the hot regeneration fluid (taken from the environment by the second operating means P2 and heated by the heater H). This heating step may be controlled based on the dewpoint of the regeneration fluid leaving the first dehumidifier 3, and determined, for example, by the humidity value (absolute or relative) measured by the sensor means D1.

This control may comprise, in particular, the step of determining the dewpoint of the regeneration fluid leaving the first dehumidifier 3 and, if this dewpoint is equal to or less than a predetermined value, the sending of the hot regeneration fluid to the first dehumidifier 3 is interrupted (i.e. interrupting the heating phase).

This control may comprise, in particular, the step of determining the dewpoint of the regeneration fluid leaving the first dehumidifier 3 and, if this dewpoint is equal to or less than a predetermined value, the sending of the hot regeneration fluid to the first dehumidifier 3 is continued and at least a part of the regeneration fluid (or all the fluid) leaving the first dehumidifier 3 is sent to the container 2. In this case (regeneration fluid to the container 2) it is possible to provide a step of withdrawing the wet process fluid from the container 2, to send at least one part thereof to the second dehumidifier 4, to mix at least one part of the regeneration fluid leaving the first dehumidifier 3 with the dehumidified process fluid leaving the second dehumidifier 4, and to send such mixture of fluids to the container 2.

It is possible to provide the step of measuring at least one chemical-physical parameter of this mixture of fluids (regeneration fluid leaving the first dehumidifier 3 and dehumidified process fluid leaving the second dehumidifier 4) and to control, based on this chemical-physical parameter, the flow of the regeneration fluid coming out of the first dehumidifier 3 to be then mixed with the dehumidified process fluid coming out of the second dehumidifier 4. It is possible to provide a step of controlling, based on the chemical-physical parameter of the mixture, the flow of the dehumidified process fluid leaving the second dehumidifier 4 to then be mixed with the regeneration fluid leaving the first dehumidifier 3. The aforementioned chemical-physical parameter may comprise, for example, the dewpoint and/or the humidity (absolute or relative) and/or the temperature of the fluid mixture.

In the present description, the chemical-physical parameter used to take into account the quantity of water vapor of the processed fluids is the dewpoint, which represents the parameter usually adopted in the field of plastics treatment. It is possible, however, to use other parameters, such as, for example, absolute humidity, relative humidity, water vapor ratio, etc.

As has been seen, the control means of the apparatus 1 is configured, in particular, to control the regeneration process of the first dehumidifier 3 and of the second dehumidifier 4, so as to improve the energy efficiency of the aforesaid process of regeneration, a process that includes a first phase of heating the molecular sieves, in which the molecular sieves release to the regeneration fluid (which will then be evacuated into the environment) the moisture that was contained in the process fluid and which was previously adsorbed in the operative phase, and a second step of cooling the molecular sieves in which at least a part of the wet process fluid coming from the container 2 can be used.

The control means may be configured so as to interrupt the heating phase of the regeneration cycle of a dehumidifier (3 or 4) when the dewpoint of the regeneration fluid at the outlet of the dehumidifier reaches a predetermined value (for example between −65° C. and −80° C.).

The cooling step allows the heat transferred during the heating step to be removed, in order to bring the molecular sieves back to a desired temperature suitable to subsequently carry out an effective adsorption, for example a temperature between 60° C. and 65° C.

The control means may be configured so as to perform, at the end of the cooling step, a static phase of the regeneration cycle in which the newly regenerated and cooled molecular sieve remains sealed without any passage or contact with the process fluid.

It can be observed that in the cooling phase of the dehumidifier regeneration cycle it is possible to recover a large part of the heat used in the previous heating phase.

The regeneration circuit of the apparatus 1 may be isolated (for example by means of the valve means 8) from the process circuit. It is thus possible to send a part of the process fluid to the newly regenerated hot dehumidifier, while another part is sent to the operating dehumidifier during the adsorption process. It has been seen that this sending may be controlled, in particular, as a function of the temperature of the mixture of fluids at the outlet of the two dehumidifiers, so that the temperature of the mixture (to be sent to the container 2) is lower or at most equal to a desired temperature (for example depending on the plastic resin processed in the container 2). This allows to exploit an energy recovery provided by the process fluid that passes through the newly regenerated hot dehumidifier, obtaining a relatively high energy yield, leaving the adsorption capacity of the dehumidifier substantially unchanged since, as we have seen, at high temperatures the molecular sieves retain humidity to a somewhat reduced degree. In other words, the quality of the regeneration is not compromised by the passage of moist air (process fluid), until the temperature of the molecular sieve remains relatively high, for example greater than about 80° C.-100° C., thus taking full advantage of the ability to extract thermal energy from the process fluid. It is possible, for example, to interrupt the cooling phase (i.e. to send a part of the process fluid to the newly regenerated dehumidifier) when the temperature at the outlet of the dehumidifier falls below a predetermined value.

In the cooling phase, the second operating means P2, which is arranged to generate the flow of the regeneration fluid, may remain off, with consequent energy savings. The circulation of the cooling fluid, which in this case is the wet process fluid coming from the container 2, may be entrusted to the first operating means P1.

It should be noted that the apparatus 1 may not necessarily require the use of an external or specific source of cooling means (for example a source of chilled water and/or cooling liquid from evaporative tower and/or from a natural source such as a water well or stream, etc.) suitable for cooling a fluid that passes through the molecular sieve dehumidifier.

The apparatus 1 also allows to recover at least a part of the energy expended during the heating phase of the regeneration cycle. It has been seen that this heating step may be carried out in an open circuit, i.e. by sucking air from the environment which is heated to a given temperature (for example between 200° C. and 300° C.) and then expelled again into the environment after having processed the dehumidifier (molecular sieve tower).

The apparatus 1 enables a control method to be implemented which provides for determining, for example by means of a (absolute) humidity sensor, when the dewpoint of the regeneration fluid (hot air) leaving the dehumidifier 3 or 4 (tower with molecular sieves), in the heating phase of the regeneration cycle, falls below a predetermined value (for example between −20° C. and −25° C.), depending on the process conditions of the plastic resin in the container 2. This makes it possible to ensure that the humidity has been evacuated correctly and therefore it will be possible, in the course of the process, to reach a condition in which the final dewpoint is the desired one, for example between −65° C. and −80° C.

It is possible to block the heating phase at the aforementioned dewpoint value, without reaching the desired condition, so as to obtain a considerable energy saving (primary energy with high content), which is preferable when an extremely negative dewpoint is not requested. It is also possible to continue the heating phase and send a part of the hot regeneration fluid, no longer in the environment, but to the container 2, mixing it first with dehumidified process fluid leaving the other dehumidifier during the process. In this way it is possible to obtain a certain energy saving.

The apparatus 1 can also allow to reduce the pressure losses, to increase the thermal recovery of the energy expended to move the air flows in the process and regeneration circuits, to increase the heat recovery of the energy accumulated in the heating phase in the mass of molecular sieves and in the metal mass of the elements that contain the sieves themselves.

It has been seen that the control of the apparatus 1 may provide that the entire flow of the process fluid bypasses both the dehumidifiers 3 and 4, in particular when the temperature and the dewpoint of the process fluid which must return to the container 2 (hopper) are equal to the desired temperature and dewpoint (set point values). This specific situation may occur, in particular, when the removal of material from the container 2 (dehumidification hopper) towards the user (extruder, press, etc.) is canceled (production has stopped), so there is no supply of humidity in the process fluid, since there is no supply of new and/or fresh plastic material in the container 2 and, furthermore, there may not be the need for an energy supply (except for losses due to heat dispersion of the dehumidification apparatus 1).

The cooling phase could be controlled, as seen above, by solving a system of equations in which the unknowns are M1, M2, M3. This method is particularly fast and precise. It is possible to implement another example of a method for controlling the cooling phase of the regeneration cycle of a dehumidifier (with molecular sieves) which could envisage modifying the flow rates M1, M2, M3 by put and take technique (which may be implemented, for example, by a control PID) with the aim of reaching the desired values of flow M, temperature T and dewpoint D of the mixture entering the container 2.

A possible control method by put and take technique may comprise, for example, a starting condition (start cooling phase) in which M1=M, M2=M3=0 (considering M1=flow in the tower in the process phase of adsorption, M2=flow in the tower during regeneration cooling). Then it is possible to carry out a first control phase based on the temperature T of the mixture, in which the flow rate M2 is adjusted until it reaches the desired temperature Tset of the mixture (M1=M−M2, M2>0, M3=0). It is possible to set a maximum value of the flow M2 which cannot be exceeded. Once the desired temperature Tset of the mixture is reached, it is possible to carry out a second control phase based on the dewpoint D of the mixture, in which the flow rate M3 is adjusted to reach the desired dewpoint Dset of the mixture (M1=M−M2−M3, M2>0, M3>0). It is possible to impose a maximum value of the flow M3 that cannot be exceeded.

Figure 15:
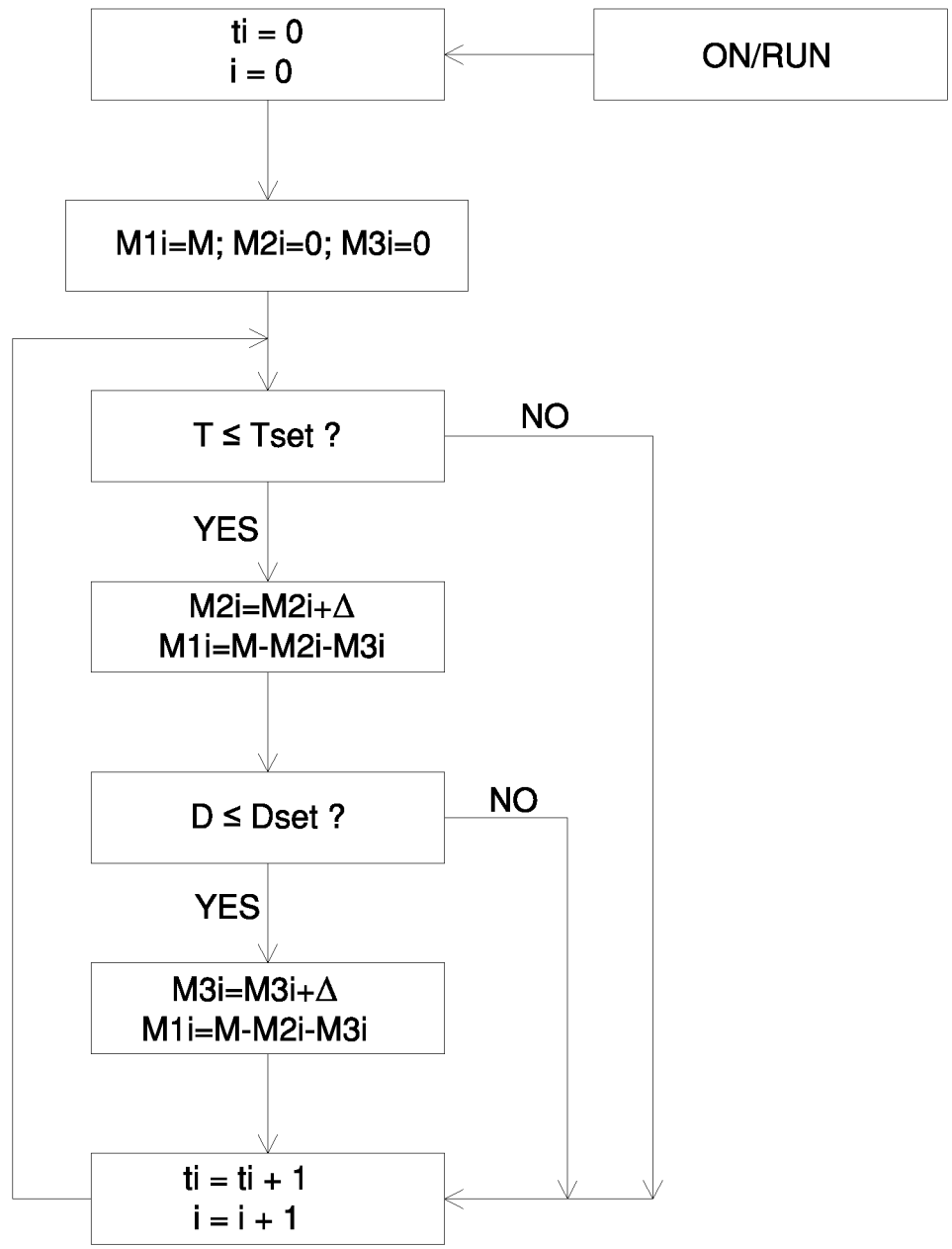
FIG. 15 is a block diagram of an example of an algorithm for controlling the cooling phase of the regeneration cycle of a dehumidifier 3 or 4.

The block diagram of FIG. 15 describes an example of a possible algorithm for controlling the cooling phase of the regeneration cycle of a dehumidifier (with molecular sieves) which uses a put and take technique method. This algorithm (by way of non-limiting example) provides for checking whether the temperature T of the mixture is less than or equal to the desired temperature Tset (set point) and therefore, if so, the flow M2 (cooling) is increased of a predetermined quantity Δ, in which the quantity Δ may comprise a predetermined fixed quantity or a quantity which, for example, may depend on the difference T−Tset. If not, the flow M2 remains unchanged (zero). Then the algorithm expects to verify if the mixture dewpoint D is less than or equal to the desired dewpoint Dset (set point) and therefore, if so, the flow M3 (bypass) is increased by a predetermined quantity Δ, in which the quantity Δ may include a predetermined fixed quantity or a quantity which, for example, may depend on the difference D−Dset. If not, the flow M3 remains unchanged (zero). As can be seen, the method with put and take technique is particularly simple, requiring no knowledge of the measured temperature and dewpoint values T1, T2, T3, DP1, DP2, DP3.

The invention claimed is:

1. A dehumidification apparatus comprising:
   at least one container for dehumidifying incoherent plastic material, said at least one container comprising at least one inlet and at least one outlet for process fluid;
   at least one first dehumidifier and at least one second dehumidifier arranged in parallel to dehumidify the process fluid;
   a circuit that circulates the process fluid in said at least one first and second dehumidifiers and a regenerating fluid for regenerating said at least one first and second dehumidifiers;
   at least one first distributor arranged in said circuit and controlled so as to assume at least the following configurations:
      a first configuration in which the process fluid can pass through said at least one first dehumidifier and not through said at least one second dehumidifier and the regenerating fluid can pass through said at least one second dehumidifier and not through said at least one first dehumidifier;
      a second configuration in which the process fluid can pass through said at least one second dehumidifier and not through said at least one first dehumidifier and the regenerating fluid can pass through said at least one first dehumidifier and not through said at least one second dehumidifier; and
a third configuration in which the regenerating fluid cannot pass neither through said at least one first dehumidifier, nor through said at least one second dehumidifier and the process fluid can pass both through said at least one first dehumidifier and through said at least one second dehumidifier;
a sensor that detects at least one chemical-physical parameter of the process fluid which enters said container;
a controller configured to control said at least one first distributor based on the at least one chemical-physical parameter detected by said sensor so as to vary the ratio of a first flow of process fluid passing through said at least one first dehumidifier and a second flow of process fluid passing through said at least one second dehumidifier; said controller being configured to perform the following steps:
a first regenerating step of the at least one first dehumidifier in which the regenerating fluid passes through the at least one first dehumidifier and the process fluid passes through the at least one second dehumidifier;
a second regenerating step of the at least one first dehumidifier in which a part of the process fluid passes through the at least one second dehumidifier while another part of the process fluid passes through the at least one first dehumidifier in order to cool the at least one first dehumidifier, said at least one first distributor being controlled based on the at least one chemical-physical parameter detected by said sensor during said second regenerating step of the at least one first dehumidifier.

2. The dehumidification apparatus according to claim 1, said apparatus comprising:
at least one source of said regenerating fluid connected to said circuit for regenerating said at least one first and second dehumidifiers;
said at least one first distributor comprising: at least one first inlet connected to said at least one outlet of the container, at least one second inlet connected to said at least one source of the regenerating fluid, at least one first outlet connected to said at least one first dehumidifier, at least one second outlet connected to said at least one second dehumidifier characterized in that said at least one first distributor comprises, at least one first movable member which puts said at least one first outlet in communication selectively with said at least one first inlet or with said at least one second inlet, and at least one second movable member that puts said at least one second outlet in communication selectively with said at least one first inlet or with said at least one second inlet, said at least one first and second movable members being independently operable with respect to one another.

3. The apparatus according to claim 2, comprising:
at least one second fluid distributor comprising: at least one third inlet connected to said at least one first dehumidifier, at least one fourth inlet connected to said at least one second dehumidifier, at least one third outlet connected to said at least one inlet of the at least one container, at least one fourth outlet connected to a discharge of the regenerating fluid, at least one third movable member putting said at least one third inlet in communication selectively with said at least one third outlet or with said at least one fourth outlet, and at least one fourth movable member putting said at least one fourth inlet in communication selectively with said at least one third outlet or with said at least one fourth outlet, said at least one third and fourth movable members being independently operable with respect to each other-valve means arranged to close the communication between said source of the regenerating fluid and said second inlet; said apparatus comprising, in particular, programmable electronic control means configured for controlling said valve means.

4. The apparatus according to claim 3, wherein:
said circuit comprises at least one bypass line which allows the wet process fluid to bypass said at least one first and second dehumidifiers and at least one control valve which controls the flow in said at least one bypass line, said at least one bypass line connecting an auxiliary outlet of said at least one first distributor with an auxiliary inlet of said at least one second distributor, said auxiliary outlet being in communication with said at least one first inlet of the at least one first distributor and said auxiliary inlet being in communication with said at least one third outlet of the at least one second distributor.

5. The apparatus according to claim 4, said sensor comprising second sensor that determines a second parameter of the fluid that enters said at least one container, said controller being configured to control said control valve according to said second parameter.

6. The apparatus according to claim 2, wherein said at least one first distributor comprises five chambers which are a central chamber communicating with said at least one first inlet, a first intermediate chamber communicating with said at least one first outlet, a second intermediate chamber communicating with said at least one second outlet, and two end chambers both communicating with said at least one second inlet, said first intermediate chamber being connected on one side to said central chamber and on the opposite side to one of said two end chambers, said second intermediate chamber being connected on one side to said central chamber and on the opposite side to the other of said two end chambers, said first movable member being movable in said first intermediate chamber operated by first driving means, said second movable member being movable in said second intermediate chamber operated by second driving means, said first and second driving means being independent of each other.

7. The apparatus according to claim 2, said sensor comprising first sensor that determines a first parameter of the fluid in said circuit which enters said at least one container, said controller being configured to control said first movable member and/or said second movable member based on said first parameter so as to vary the ratio between a first part of wet process fluid circulating in said at least one first dehumidifier and a second part of wet process fluid circulating in said at least one second dehumidifier.

8. The apparatus according to claim 1, said apparatus comprising:
a regenerating means that regenerates said first dehumidifier by heating with said regenerating fluid;
said controller configured to control said regenerating means according to a dewpoint, or other parameter indicating an amount of moisture, of the regenerating fluid at the outlet of said first dehumidifier, and to send at least a part of the regenerating fluid exiting said first dehumidifier to said container when said dewpoint or said other parameter indicating the amount of moisture is equal to or less than a predetermined value.

9. The apparatus according to claim 8, said controller being configured to interrupt a sending of the regenerating fluid to said at least one first dehumidifier when said dewpoint is equal to or less than a predetermined value.

10. A dehumidification method comprising:
providing a container for dehumidifying incoherent plastic material by process fluid;
withdrawing wet process fluid from said container and sending the wet process fluid to a first dehumidifier and then returning the process fluid dehumidified by said first dehumidifier to said container;
after withdrawing, regenerating said first dehumidifier by heating with hot regenerating fluid which is sent to said first dehumidifier;
controlling said regenerating according to the dewpoint, or other parameter indicating an amount of moisture, of the regenerating fluid at the outlet of said first dehumidifier, wherein at least a part of regenerating fluid exiting said first dehumidifier is sent to said container;
connecting a second dehumidifier to said container, said first and second dehumidifiers being arranged in parallel to alternate process cycles to retain moisture contained in the process fluid and regeneration cycles to eliminate retained moisture;
withdrawing wet process fluid from said container and delivering a first part of said fluid to said first dehumidifier, a second part to said second dehumidifier and a third part to a bypass line bypassing said first and second dehumidifiers;
forming a mixture including fluid leaving said first dehumidifier, fluid leaving said second dehumidifier and fluid bypassed in said bypass line;
returning said mixture to said container;
determining the flows of said first, second and third parts of fluid in such a way as to obtain a desired dewpoint, or other parameter indicative of the amount of moisture, a desired temperature and a desired flow of said mixture to be returned to said container;
wherein said determining comprises a calculation step which uses measured values of the following parameters:
temperature, dewpoint, or other parameter indicating the amount of moisture, and first flow of said first part of fluid at the outlet of said first dehumidifier and before mixing;
temperature, dewpoint, or other parameter indicating the amount of moisture, and second flow of said second part of fluid at the outlet of said second dehumidifier and before mixing; and
temperature, dewpoint, or other parameter indicating the amount of moisture, and third flow of said third part of bypassed fluid and before mixing.

11. The method according to claim 10, wherein said controlling comprises controlling the flow of the regenerating fluid based on the dewpoint, or other parameter indicating the amount of moisture, of the regenerating fluid exiting said first dehumidifier.

12. The method according to claim 10, said controlling comprising interrupting the sending of said hot regenerating fluid to said first dehumidifier when said dewpoint is equal to or less than a predetermined value.

13. The method according to claim 10, wherein:
the regenerating fluid exiting said first dehumidifier is sent to said container when said dewpoint is equal to or less than a predetermined value.

14. The method according to claim 10, wherein said determining comprises resolution of a system of equations comprising an energy balance equation and two mass balance equations; wherein said two mass balance equations are two of the following equations: mass balance equation of overall dry fluid and humidity, mass balance equation of humidity only, mass balance equation of dry fluid only.

15. The method according to claim 10, comprising:
measuring the temperature of said first part of fluid at the outlet of said first dehumidifier and of bringing the flow of said first part of fluid to zero if such temperature is equal or greater than a predetermined value;
measuring the temperature of said second part of fluid at the outlet of said second dehumidifier and of bringing the flow of said second part of fluid to zero if such temperature is equal to or greater than a predetermined value;
measuring the temperature and/or a parameter indicative of the amount of moisture of said third part of bypassed fluid before mixing and the bringing the flows of said first and second parts of fluid to zero if said temperature is equal to a desired temperature of said mixture to be returned to said container and/or if said parameter is equal to a desired parameter of said mixture to be returned to said container, said parameter consisting of at least one of the following parameters: dewpoint, relative humidity, absolute humidity, vapor quality;
bringing the first flow of said first part of fluid to zero and then regenerating said first dehumidifier; and
bringing the second flow of said second part of fluid to zero and then regenerating said second dehumidifier.

16. The method according to claim 10, wherein the third flow of said third part of fluid is increased if the dewpoint, or other parameter indicative of the amount of moisture, of said mixture, before returning to said container, is less than or equal to a desired dewpoint.

17. The method according to claim 10, comprising:
regenerating said second dehumidifier by delivering hot regenerating fluid and then interrupting the delivery of regenerating fluid to said second dehumidifier, it being provided that, after said second dehumidifier has been heated by said regenerating fluid, the second flow of said second part of fluid is increased if the temperature of said mixture before returning to said container is less than or equal to a desired temperature of said mixture; and/or
regenerating said first dehumidifier by delivering hot regenerating fluid and then interrupting the delivery of regenerating fluid to said first dehumidifier, it being provided that, after said first dehumidifier has been heated by said regenerating fluid, the first flow of said first part of fluid is increased if the temperature of said mixture before returning to said container is less than or equal to a desired temperature of said mixture.

18. The method according to claim 10, comprising withdrawing wet process fluid from said container and sending the wet process fluid to a second dehumidifier, at least a part of the regenerating fluid exiting said first dehumidifier being mixed with dehumidified process fluid exiting said second dehumidifier, said mixture of fluids being sent to said container.

19. The method according to claim 10, comprising, after said regenerating said first dehumidifier, withdrawing wet process fluid from said container and sending the first part thereof to said first dehumidifier to cool said first dehumidifier and the second part thereof to a second dehumidifier, wherein process fluid exiting said first dehumidifier and process fluid exiting said second dehumidifier are mixed and the mixture is sent to said container.

20. The method according to claim 19, wherein a first flow of said first part of process fluid and/or a second flow of said second part of process fluid is regulated according to a chemical-physical parameter of said mixture, said chemical-physical parameter consisting of the temperature and/or the dewpoint or other parameter indicating an amount of moisture.

21. A dehumidification method, comprising:
   providing at least one container for dehumidifying incoherent plastic material by process fluid, said at least one container comprising at least one inlet and at least one outlet for process fluid;
   providing at least one first dehumidifier and at least one second dehumidifier arranged in parallel to dehumidify the process fluid;
   circulating, in a circuit, the process fluid in said at least one first and second dehumidifiers;
   circulating, in the circuit, a regenerating fluid for regenerating said at least one first and second dehumidifiers;
   providing, in the circuit, at least one distributor which is controlled to assume at least the following configurations:
      a first configuration in which the process fluid can pass through said at least one first dehumidifier and not through said at least one second dehumidifier and a regenerating fluid can pass through said at least one second dehumidifier and not through said at least one first dehumidifier;
      a second configuration in which the process fluid can pass through said at least one second dehumidifier and not through said at least one first dehumidifier and the regenerating fluid can pass through said at least one first dehumidifier and not through said at least one second dehumidifier; and
      a third configuration in which the regenerating fluid cannot pass neither through said at least one first dehumidifier, nor through said at least one second dehumidifier and the process fluid can pass both through said at least one first dehumidifier and through said at least one second dehumidifier;
   detecting, by a sensor, at least one chemical-physical parameter of the process fluid which enters said container;
   controlling, by a controller, said at least one distributor based on the at least one chemical-physical parameter detected by said sensor so as to vary the ratio of a first flow of process fluid passing through said at least one first dehumidifier and a second flow of process fluid passing through said at least one second dehumidifier;
   performing a first regenerating step of the at least one first dehumidifier in which the regenerating fluid passes through the at least one first dehumidifier and the process fluid passes through the at least one second dehumidifier;
   performing a second regenerating step of the at least one first dehumidifier in which a part of the process fluid passes through the at least one second dehumidifier while another part of the process fluid passes through the at least one first dehumidifier in order to cool the at least one first dehumidifier, said at least one distributor being controlled based on said at least one chemical-physical parameter during said second regenerating step of the at least one first dehumidifier.

* * * * *